US011700623B2

(12) United States Patent
Adachi

(10) Patent No.: US 11,700,623 B2
(45) Date of Patent: *Jul. 11, 2023

(54) WIRELESS DEVICE AND WIRELESS COMMUNICATION METHOD

(71) Applicant: International Semiconductor Group, Seoul (KR)

(72) Inventor: Tomoko Adachi, Kanagawa (JP)

(73) Assignee: International Semiconductor Group, Seoul (KR)

( * ) Notice: Subject to any disclaimer, the term of this patent is extended or adjusted under 35 U.S.C. 154(b) by 24 days.

This patent is subject to a terminal disclaimer.

(21) Appl. No.: 17/199,727

(22) Filed: Mar. 12, 2021

(65) Prior Publication Data

US 2021/0204249 A1 Jul. 1, 2021

Related U.S. Application Data

(63) Continuation of application No. 15/202,960, filed on Jul. 6, 2016, now Pat. No. 10,966,180.

(30) Foreign Application Priority Data

Jul. 7, 2015 (JP) .................................. 2015-136480
Jul. 5, 2016 (JP) .................................. 2016-133604

(51) Int. Cl.
*H04W 72/0453* (2023.01)
*H04W 72/30* (2023.01)
*H04L 5/00* (2006.01)

(52) U.S. Cl.
CPC ....... *H04W 72/30* (2023.01); *H04W 72/0453* (2013.01); *H04L 5/0037* (2013.01)

(58) Field of Classification Search
None
See application file for complete search history.

(56) References Cited

U.S. PATENT DOCUMENTS 8,290,503 B2   10/2012   Sadek et al.
8,363,578 B1    1/2013   Ramamurthy et al.
(Continued)

FOREIGN PATENT DOCUMENTS

CN   103828457 A      5/2014
EP   2 589 191 A1     5/2013
(Continued)

OTHER PUBLICATIONS

Deng et al., "IEEE 802.11ax: Next Generation Wireless Local Area network", 2014 10th International Conference on Heterogeneous networking for Quality, reliability, Security and Robustness, 2014.
(Continued)

*Primary Examiner* — Jenkey Van
(74) *Attorney, Agent, or Firm* — Foley & Lardner LLP

(57) ABSTRACT

According to one embodiment, a wireless device includes a transmitter; and a receiver. The transmitter is configured to transmit a first frame including information that designates a plurality of frequency components and instructing execution of frequency multiplexing transmission by a plurality of wireless communication terminals; and the receiver is configured to receive the second frame by at least one frequency component of the plurality of frequency components. The first frame has either a first form or a second form, the first form designates individual terminal identifiers of the plurality of wireless communication terminals, the terminal identifiers each being associated with at least one of the plurality of frequency components, and the second form designates a group identifier of a group to which the plurality of wireless communication terminals belong.

17 Claims, 15 Drawing Sheets

(56) References Cited

U.S. PATENT DOCUMENTS

| | | |
|---|---|---|
| 8,811,426 B1 | 8/2014 | Banerjea |
| 9,100,984 B2 | 8/2015 | Kim et al. |
| 9,281,928 B2 | 3/2016 | Porat et al. |
| 9,641,234 B2 | 5/2017 | Moon |
| 9,800,501 B2 | 10/2017 | Merlin |
| 10,128,925 B2 | 11/2018 | Chun et al. |
| 10,404,425 B2 | 9/2019 | Adachi et al. |
| 10,728,802 B2 | 7/2020 | Adachi et al. |
| 10,966,214 B2 | 3/2021 | Adachi et al. |
| 2006/0187942 A1 | 8/2006 | Mizutani et al. |
| 2006/0203837 A1 | 9/2006 | Shvodian |
| 2006/0245447 A1 | 11/2006 | Chou et al. |
| 2012/0009888 A1 | 1/2012 | Smadi |
| 2012/0218983 A1 | 8/2012 | Noh et al. |
| 2012/0275405 A1 | 11/2012 | Kim et al. |
| 2013/0064119 A1 | 3/2013 | Montojo et al. |
| 2013/0265907 A1 | 10/2013 | Kim et al. |
| 2014/0045514 A1 | 2/2014 | Lee et al. |
| 2014/0198642 A1 | 7/2014 | Barriac et al. |
| 2015/0063111 A1 | 3/2015 | Merlin et al. |
| 2015/0063258 A1 | 3/2015 | Merlin et al. |
| 2015/0146653 A1 | 5/2015 | Zhang et al. |
| 2015/0146654 A1 | 5/2015 | Chu et al. |
| 2015/0172012 A1 | 6/2015 | Abeysekera et al. |
| 2015/0188675 A1 | 7/2015 | Abeysekera et al. |
| 2015/0201434 A1 | 7/2015 | Fang et al. |
| 2016/0007325 A1 | 1/2016 | Seok |
| 2016/0014725 A1 | 1/2016 | Yu et al. |
| 2016/0044533 A1 | 2/2016 | Seok |
| 2016/0057736 A1 | 2/2016 | Jung et al. |
| 2016/0105836 A1 | 4/2016 | Seok |
| 2016/0128024 A1 | 5/2016 | Frederiks et al. |
| 2016/0128102 A1 | 5/2016 | Jauh et al. |
| 2016/0143006 A1 | 5/2016 | Ghosh et al. |
| 2016/0165589 A1 | 6/2016 | Chu et al. |
| 2016/0183305 A1 | 6/2016 | Huang et al. |
| 2016/0227533 A1 | 8/2016 | Josiam et al. |
| 2016/0227579 A1 | 8/2016 | Stacey et al. |
| 2016/0242070 A1 | 8/2016 | Asterjadhi et al. |
| 2016/0278081 A1 | 9/2016 | Chun |
| 2016/0309508 A1 | 10/2016 | Li et al. |
| 2016/0330722 A1 | 11/2016 | Pantelidou et al. |
| 2016/0353434 A1 | 12/2016 | Ghosh et al. |
| 2016/0353435 A1 | 12/2016 | Ghosh |
| 2016/0360507 A1 | 12/2016 | Cariou et al. |
| 2016/0374070 A1 | 12/2016 | Ghosh |
| 2017/0026151 A1 | 1/2017 | Adachi |
| 2017/0048882 A1 | 2/2017 | Li et al. |
| 2017/0079071 A1 | 3/2017 | Zhou et al. |
| 2017/0127428 A1 | 5/2017 | Adachi et al. |
| 2017/0127453 A1 | 5/2017 | Adachi et al. |
| 2017/0171723 A1 | 6/2017 | Adachi et al. |
| 2017/0180088 A1 | 6/2017 | Adachi et al. |
| 2017/0181039 A1 | 6/2017 | Adachi et al. |
| 2017/0188362 A1 | 6/2017 | Cariou et al. |
| 2017/0196010 A1 | 7/2017 | Matsuo et al. |
| 2017/0245306 A1 | 8/2017 | Kim et al. |
| 2017/0289933 A1 | 10/2017 | Segev et al. |
| 2017/0289987 A1 | 10/2017 | Seok |
| 2017/0366321 A1 | 12/2017 | Kim et al. |
| 2018/0007561 A1 | 1/2018 | Adachi et al. |
| 2018/0007701 A1 | 1/2018 | Adachi et al. |
| 2018/0014316 A1 | 1/2018 | Guo et al. |
| 2018/0035488 A1 | 2/2018 | Yang et al. |
| 2018/0048573 A1 | 2/2018 | Merlin et al. |
| 2018/0054240 A1 | 2/2018 | Cariou et al. |
| 2018/0077735 A1* | 3/2018 | Ahn ................ H04W 28/26 |
| 2018/0084605 A1 | 3/2018 | Li et al. |
| 2018/0110076 A1 | 4/2018 | Ko et al. |
| 2018/0124858 A1 | 5/2018 | Gan et al. |
| 2018/0167882 A1* | 6/2018 | Choi ................ H04W 72/121 |
| 2018/0184454 A1* | 6/2018 | Viger ............... H04W 74/0808 |
| 2018/0376507 A1 | 12/2018 | Kwon et al. |
| 2019/0230629 A1 | 7/2019 | Chu et al. |
| 2022/0279528 A1* | 9/2022 | Ahn ................ H04W 84/12 |
| 2023/0058825 A1* | 2/2023 | Li ................ H04W 74/0858 |

FOREIGN PATENT DOCUMENTS

| | | |
|---|---|---|
| EP | 3 294 036 A1 | 5/2015 |
| JP | 2005-223937 A | 8/2005 |
| JP | 2012-517147 A | 7/2012 |
| JP | 2013-219687 A | 10/2013 |
| JP | 2015-515826 A | 5/2015 |
| JP | 2017-085570 A | 5/2017 |
| JP | 6656347 B2 | 3/2020 |
| JP | 6656348 B2 | 3/2020 |
| WO | WO-2006/000955 A1 | 1/2006 |
| WO | WO-2012/002855 A1 | 1/2012 |
| WO | WO-2014/014084 A1 | 1/2014 |
| WO | WO-2015/031431 A1 | 3/2015 |
| WO | WO-2015/068968 A1 | 5/2015 |
| WO | WO-2016/032007 A1 | 3/2016 |
| WO | WO-2016/126370 A1 | 8/2016 |
| WO | WO-2016/175328 A1 | 11/2016 |
| WO | WO-2016/175329 A1 | 11/2016 |

OTHER PUBLICATIONS

Final Office Action on U.S. Appl. No. 16/519,915 dated Jun. 22, 2021.
U.S. Office Action on U.S. Appl. No. 16/527,852 dated Apr. 26, 2021.
U.S. Office Action on U.S. Appl. No. 16/903,570 dated Apr. 21, 2021.
Notice of Allowance on U.S. Appl. No. 16/519,915 dated Nov. 4, 2021.
Notice of Allowance on U.S. Appl. No. 16/527,852 dated Dec. 3, 2021.
Notice of Allowance on U.S. Appl. No. 16/903,570 dated Nov. 26, 2021.
U.S. Appl. No. 15/267,863, filed Sep. 16, 2016, Kabushiki Kaisha Toshiba.
U.S. Appl. No. 15/237,885, filed Sep. 16, 2016, Kabushiki Kaisha Toshiba.
U.S. Appl. No. 15/392,391, filed Dec. 28, 2016, Kabushiki Kaisha Toshiba.
U.S. Appl. No. 15/445,528, filed Feb. 28, 2017, Adachi et al.
U.S. Appl. No. 15/445,702, filed Feb. 28, 2017, Adachi et al.
U.S. Appl. No. 16/410,359, filed May 13, 2019, Adachi et al.
U.S. Appl. No. 16/527,852, filed Jul. 31, 2019, Adachi et al.
U.S. Appl. No. 16/519,915, filed Jul. 23, 2019, Adachi et al.
U.S. Appl. No. 16/903,570, filed Jun. 17, 2020, Adachi et al.
U.S. Appl. No. 62/112,894, filed Feb. 6, 2015, Chu et al.
Azizi et al.: "OFDMA Numerology and Structure", IEEE 802.11-15/0330r5, Intel and LGE, May 2015, pp. 1-50.
Ghosh, Chittabrata et al.: "Random Access With Trigger Frames Using OFDMA", IEEE 802.11-15/0604r1, Intel, May 2015, pp. 1-16.
IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.
Park, Minyoung: "Specification Framework for TGah", IEEE 802.11-11/1137r15, Intel, May 2013, pp. 1-77.
Stacey, Robert: "Specification Framework for TGax", IEEE 802.11-15/0132r17, Intel, May 2016, pp. 1-61.
Stacey, Robert: "Specification Framework for TGax", IEEE 802.11-15/0132r5, Intel, May 2015, pp. 1-7.
Stéphane Baron et al.: "RU selection process upon TF-R reception; 11-15-1047-00-00ax-ru-selection-process-upon-tf-r-reception", Canon,

(56) References Cited

OTHER PUBLICATIONS

IEEE Draft; 11-15-1047-00-00AX-RU-Selection-Process-Upon-TF-R-Reception, IEEE-SA Mentor, Piscataway, NJ USA, vol. 802.11 ax, Sep. 14, 2015, pp. 1-9, XP068098236, {retrieved on Sep. 14, 2015}.
Stacey, Robert: "Specification Framework for TGax", IEEE 11-15-0132-05-OOax-spec-framework, Intel, May 2015, pp. 1-7.
Stacey, Robert: "Specification Framework for TGax," IEEE 11-15-0132-17-00ax-spec-framework, Intel, May 2016, pp. 1-61.
Stacey, Robert: "Specification Framework for TGax," IEEE 11-15-0132-08-00ax-spec-framework, Intel, Sep. 2015, pp. 1-22.
Adachi et al.: US Office Action on U.S. Appl. No. 15/267,863 dated Jan. 26, 2018.
Adachi et al.: US Office Action on U.S. Appl. No. 15/267,885 dated Apr. 2, 2018.
U.S. Final Office Action dated Jul. 3, 2018 issued in co-pending U.S. Appl. No. 15/267,863.
U.S. Non-Final Office Action dated Jul. 3, 2018 issued in co-pending U.S. Appl. No. 15/392,391.
U.S. Non-Final Office Action dated Aug. 14, 2018 in co-pending U.S. Appl. No. 15/445,702.
Stacey, Robert: "Specification Framework for TGax", IEEE 11-15-0132-02-00ax-spec-framework, Intel, Jan. 2015, pp. 1-3.
Translation of International Preliminary Report on Patentability dated Jun. 15, 2017 received in corresponding International Application No. PCT/JP2015/083660.
IEEE Std 802.11n-2009, Oct. 29, 2009, pp. 56,76-79, URL: https://ieeexplore.ieee.org/servlet/opac?punumber=5307291.
U.S. Final Office Action dated Aug. 28, 2018 issued in co-pending U.S. Appl. No. 15/267,885.
IEEE Std 802. 11ac-2013, Dec. 11, 2013, pp. 71, 91, 98-99, 186-187, URL: https://ieeexplore.ieee.org/servlet/opac?punumber=6687185.
U.S. Non-Final Office Action dated Jul. 27, 2018 issued in co-pending U.S. Appl. No. 15/202,960.
U.S. Non-Final Office Action dated Jul. 23, 2018 issued in co-pending U.S. Appl. No. 15/445,528.
Adachi, Tomoko et al.: "Reception Status of Frames Transmitted in Random Access RUs", IEEE 802.11-15/1341r0, Toshiba, Nov. 2015, pp. 1-10.
Rizzoli et al., "Computer-aided noise analysis of integrated microwave front-ends," IEEE MTT-S Digest, 1995, pp. 1561-1564.
Stacey, Robert: "Specification Framework for TGax", IEEE 11-15-0132-13-00ax-spec-framework, Intel, Nov. 2015, pp. 1-38.
Notice of Allowance dated Jan. 23, 2019 issued in co-pending U.S. Appl. No. 15/445,702.
Notice of Allowance dated Dec. 12, 2018 issued in co-pending U.S. Appl. No. 15/267,863.
Notice of Allowance dated Feb. 6, 2019 issued in co-pending U.S. Appl. No. 15/267,863.
U.S. Final Office Action dated Feb. 21, 2019 issued in co-pending U.S. Appl. No. 15/392,391.
U.S. Final Office Action dated Feb. 21, 2019 issued in co-pending U.S. Appl. No. 15/445,528.
Notice of Allowance dated May 1, 2019 issued in co-pending U.S. Appl. No. 15/445,702.
Notice of Allowance dated Mar. 18, 2019 issued in co-pending U.S. Appl. No. 15/267,885 (including US 2014/0198642 A1, US 2016/0360507 A1, US 2017/0366321 A1, US 2018/0035488 A1, and US 2018/0084605 A1).
Corrected Notice of Allowability dated Jul. 2, 2019 issued in co-pending U.S. Appl. No. 15/267,863.
Notice of Allowance dated Jul. 10, 2019 issued in co-pending U.S. Appl. No. 15/392,391.
U.S. Non-Final Office Action dated Aug. 30, 2019 issued in co-pending U.S. Appl. No. 15/445,528.
Adachi et al., "Regarding trigger frame in UL MU", IEEE 802.11-15/0608r1, IEEE, Internet<URL:https://mentor.ieee.org/802.11 /dcn/15/11-15-0608-01-00ax-regarding-trigger-frame-in-ul-mu.pptx>, Apr. 2015.
Girici et al., "Proportional Fair Scheduling Algorithm in OFDMA-Based Wireless Systems with QoS constraints", Journal of Communications and Networks, vol. 12, No. 1, Feb. 2010, pp. 30-42.
Ghosh, Chittabrata et al.: "Random Access With Trigger Frames Using OFDMA", IEEE 802.11-15/0604r0, Intel, May 2015, pp. 1-16.
U.S. Notice of Allowance dated Dec. 4, 2019 issued in co-pending U.S. Appl. No. 15/392,391.
U.S. Notice of Allowance dated Mar. 18, 2020 issued in co-pending U.S. Appl. No. 15/445,528.
U.S. Non-Final Office Action dated Apr. 29, 2020 issued in co-pending U.S. Appl. No. 16/410,359.
U.S. Notice of Allowance dated Nov. 27, 2020 issued in co-pending U.S. Appl. No. 16/410,359.
U.S. Non-Final Office Action dated Dec. 9, 2020 issued in co-pending U.S. Appl. No. 16/519,915.
U.S. Non-Final Office Action dated Aug. 21, 2020 issued in co-pending U.S. Appl. No. 16/527,852.
Non-Final Office Action in U.S. Appl. No. 17/689,726 dated Jan. 25, 2023.
Notice of Allowance in U.S. Appl. No. 17/213,687 dated Feb. 23, 2023.

* cited by examiner

| RU# 1 | RU# 2 | RU# 3 | RU# 4 | RU# 5 | RU# 6 | ............... | RU# K-2 | RU# K-1 | RU# K |

| RU# 11-1 | RU# 11-2 | RU# 11-3 | ............ | RU# 11-L |

| RU# 12-1 | RU# 12-2 | ...... | RU# 11-(L-1) | RU# K-1 | RU# K |

| Octets: 2 | 2 | 6 | 6 | 2 | 1 | 3×n | 4 |
|---|---|---|---|---|---|---|---|
| Frame Control | Duration /ID | Address 1 | Address 2 | Sequence Control | Group ID | RU/AID | FCS |

FIG. 15

| Octets: 2 | 2 | 6 | 6 | 2 | 1 | 1×n | 4 |
|---|---|---|---|---|---|---|---|
| Frame Control | Duration /ID | Address 1 | Address 2 | Sequence Control | Group ID | RU Notification | FCS |

FIG. 16

| Octets: 2 | 2 | 6 | 6 | 2 | 1 | 4 |
|---|---|---|---|---|---|---|
| Frame Control | Duration /ID | Address 1 | Address 2 | Sequence Control | Group ID | FCS |

FIG. 17

WIRELESS DEVICE AND WIRELESS COMMUNICATION METHOD

CROSS-REFERENCE TO RELATED APPLICATIONS

This application is a Continuation of U.S. patent application Ser. No. 15/202,960, filed on Jul. 6, 2016, which is based upon and claims the benefit of priority from Japanese Patent Application No. 2015-136480 filed Jul. 7, 2015 and No. 2016-133604 filed Jul. 5, 2016; the entire contents of all of the above applications are incorporated herein by reference.

FIELD

Embodiments of the present invention relate to a wireless device and a wireless communication method.

BACKGROUND

Frequency multiplexing communication is known according to which different frequency components for each wireless communication terminal (hereinafter referred to as terminal) are used as communication resources and transmissions to a plurality of terminals and receptions from a plurality of terminals are simultaneously performed. Here, Orthogonal Frequency Division Multiple Access (OFDMA) scheme is considered where the frequency components are defined as resource units each including one or a plurality of subcarriers, and the resource units each are used as a smallest unit of the communication resource, and transmissions to the plurality of terminals or receptions from the plurality of terminals are simultaneously performed. The simultaneous transmissions from the base station to the plurality of terminals correspond to downlink OFDMA (DL-OFDMA) transmission and the simultaneous transmissions from the plurality of terminals to the base station correspond to uplink OFDMA (UL-OFDMA) transmission.

When uplink OFDMA (UL-OFDMA) communication is to be performed, it may be considered to transmit a trigger frame from a base station in order to align the uplink transmission timings of the individual terminals. There is a method that notifies the information regarding the assignment terminals on a per-resource-unit basis by the trigger frame, and thereby designating the terminals that perform UL-OFDMA communication and the resource units to be used by the terminals. In accordance with this method, there is a problem of degradation in efficiency of utilizing communication resources in a case where a terminal has entered its sleep mode and in a case where there is no pending uplink transmission demand at a terminal. As another method, there is a method that does not perform designation of the terminals by the trigger frame but only designates the resource units to be used. In this case, a terminal that has received a trigger frame acquires a resource unit based on a technique similar to random backoff procedure. At this point, when there are a large number of terminals that have received the trigger frame, there is a high likelihood of the same resource unit being selected. When a plurality of terminals transmits frames using the same resource unit, the base station cannot successfully receive the frames.

BRIEF DESCRIPTION OF THE DRAWINGS

FIG. 15 is a diagram illustrating another exemplary format of the trigger frame;

FIG. 16 is a diagram illustrating another exemplary format of the trigger frame;

FIG. 17 is a diagram illustrating another exemplary format of the trigger frame;

DETAILED DESCRIPTION

According to one embodiment, a wireless device includes a transmitter; and a receiver.

The transmitter is configured to transmit a first frame including information that designates a plurality of frequency components and instructing execution of frequency multiplexing transmission by a plurality of wireless communication terminals.

The receiver is configured to receive the second frame by at least one frequency component of the plurality of frequency components.

The first frame has either a first form or a second form.

The first form designates individual terminal identifiers of the plurality of wireless communication terminals, the terminal identifiers each being associated with at least one of the plurality of frequency components.

The second form designates a group identifier of a group to which the plurality of wireless communication terminals belong.

Hereinafter, embodiments of the present invention will be described with reference to the drawings. The entire contents of IEEE Std 802.11™-2012 and IEEE Std 802.11ac™-2013, known as the wireless LAN specification and IEEE 802.11-15/0132r17 dated May 25, 2016 which is Specification Framework Document directed to IEEE Std 802.11ax as a next generation wireless LAN standards are herein incorporated by reference in the present specification.

First Embodiment

Figure 1:
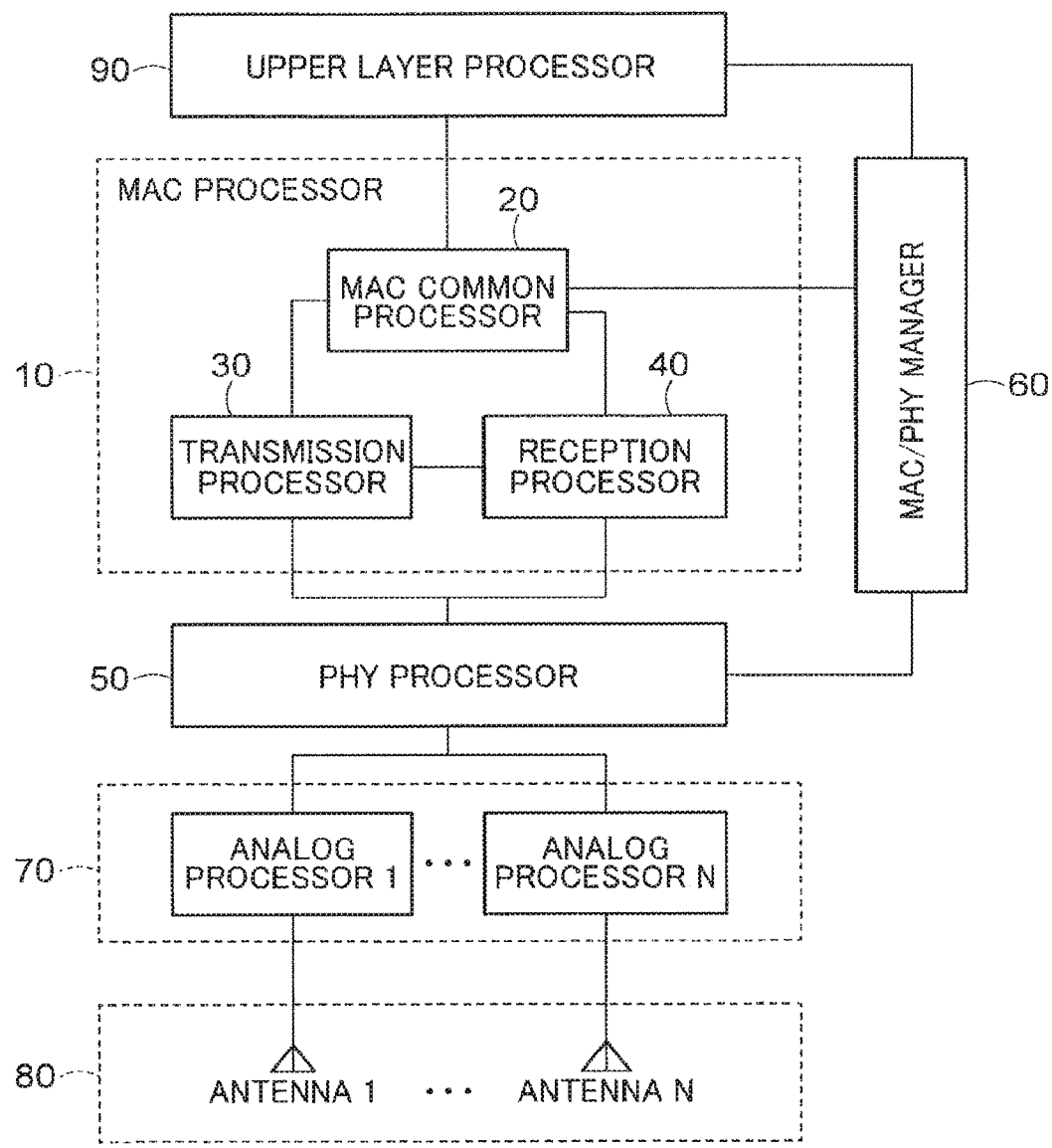
FIG. 1 is a functional block diagram of a wireless communication device according to an embodiment of the present invention.

A functional block diagram of a wireless communication device (or a wireless device) according to the first embodiment of the present invention is illustrated in FIG. 1. This wireless communication device can be implemented in a wireless communication base station (hereinafter referred to as a base station or an access point) or in a wireless communication terminal (hereinafter referred to as a terminal) that communicates with the base station. The base station is one mode of the terminal in that the base station has the same or similar communication functions with those of the terminal with exception of the base station having a relay function. When a terminal is mentioned in the following explanations, it may refer to a base station as long as the terminal and the base station should be particularly discriminated from each other.

This embodiment handles a case where uplink OFDMA (UL-OFDMA: Orthogonal Frequency Division Multiple Access) transmission is performed from a plurality of terminals to the base station. In UL-OFDMA, resource units each including one or a plurality of subcarriers are assigned to terminals (the resource unit may also be called subchannel, resource block, or frequency block), and receptions from the plurality of terminals are performed simultaneously on resource unit basis. The resource unit is a smallest unit of a resource for performing communication. FIG. 3 illustrates the resource units (RU #1, RU #2 . . . RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication is realized by different resource units being simultaneously used by different terminals.

Figures 2, 3A, 3B, 3C:
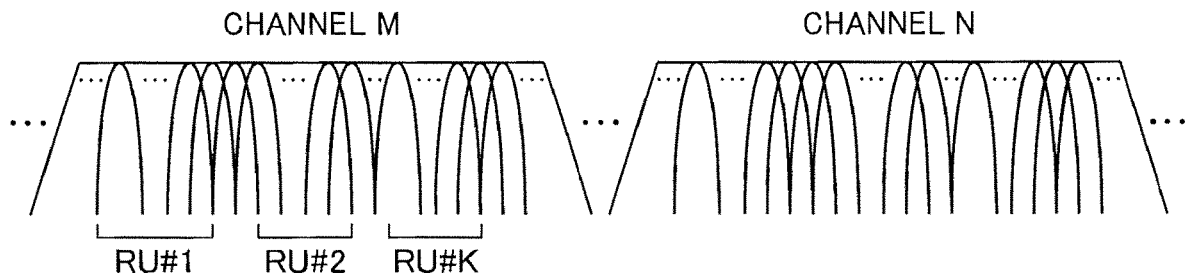
FIG. 2 is a diagram for explanation of assignment of a resource unit.
FIGS. 3(A) to 3(C) are diagrams for explanation of various configurations of the resource unit.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 3. The width direction on the paper surface corresponds to the frequency domain direction. FIG. 3(A) illustrates an example where a plurality of resource units (RU #1, RU #2 RU #K) having the same bandwidth are arranged, and FIG. 3(B) illustrates another example where a plurality of resource units (RU #11-1, RU #11-2 . . . RU #11-L) having a larger bandwidth than that of FIG. 3(A) are arranged. FIG. 3(C) illustrates a still another example where resource units with three types of bandwidths are arranged. The resource units (RU #12-1, RU #12-2) have the largest bandwidth, the resource unit RU #11-(L−1) has the bandwidth identical to that of FIG. 3(B), and the resource units (RU #K−1, RU #K) have the bandwidth identical to that of FIG. 3(A).

A specific example is illustrated. When the entire 20 MHz channel width is used, 26 resource units (tones) may be specified for the 256 subcarriers (tones) arranged within the 20 MHz channel width. In other words, nine resource units are specified in the 20 MHz channel width and the bandwidth of the resource unit becomes smaller than the 2.5 MHz width. In the case of a 40 MHz channel width, 18 resource units are specified therefor. In the case of an 80 MHz channel width, 37 resource units are specified (see doc.: IEEE 802.11-15/0330r5). When this is extended, for example, in the case of a 160 MHz channel width or an 80+80 MHz channel width, 74 resource units are specified. It will be appreciated that the width of the resource unit is not limited to a particular value and resource units of various sizes can be arranged.

Here, the number of resource units used by each terminal is not limited to a particular value and one or a plurality of resource units may be used. When a terminal uses a plurality of resource units, a plurality of resource units that are continuous in terms of frequency may be used, or a plurality of resource units that are located at positions away from each other may be allowed to be used.

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

It is assumed here that a terminal that implements OFDMA is capable of carrying out reception and decoding (including demodulation, decoding of error correcting code, etc.) of a physical packet including a frame on a channel of at least the basic channel width (20 MHz channel width if an IEEE 802.11a/b/g/n/ac standard-compliant terminal is regarded as a legacy terminal) at the legacy terminal that is to be backward compatible. With regard to the carrier sense, it is carried out in a unit of the basic channel width. The carrier sense may encompass both physical carrier sense associated with busy/idle of CCA (Clear Channel Assessment) and Virtual Carrier Sense based on medium reserve time described in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as being in the idle state by the carrier sense information are all in the idle state.

With regard to OFDMA, channel-based OFDMA is also possible in addition to the above-described resource-unit-based OFDMA. OFDMA of this case may in particular be called MU-MC (Multi-User Multi-Channel). In MU-MC, a base station assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals. The OFDMA which will be described below means the resource-unit-based OFDMA: however, an embodiment of channel-based OFDMA can also be implemented with appropriate replacement of terms and phrases in the following explanations such as reading the "resource unit" as the "channel".

Here, that in an uplink multiplex transmission from a plurality of terminals to the base station, a communication scheme (which is called OFDMA & MU-MIMO) that combines OFDMA and MU-MIMO (Multiple-Input Multiple-Output) is also possible in place of the above-described OFDMA scheme. In the uplink MU-MIMO transmission, streams are transmitted from a plurality of terminals by spatial multiplexing to the base station (simultaneously by the same frequency band), and the base station simultaneously receives these streams by a plurality of antennas. In the case of OFDMA & MU-MIMO, a plurality of terminals use the same resource unit and carry out MU-MIMO transmissions. When OFDMA is mentioned in the following explanations, it may be read as OFDMA & MU-MIMO.

In the following explanations, a terminal having the capability of carrying out UL-OFDMA may be called an UL-OFDMA-compliant terminal (or simply OFDMA-compliant terminal) or the like. A terminal that does not have the capability may be called a legacy terminal. If the capability of carrying out UL-OFDMA communication can be selectively enabled or disabled, a terminal whose capability of carrying out UL-OFDMA communication is enabled should be treated as the OFDMA-compliant terminal.

As illustrated in FIG. 1, a wireless communication device incorporated in a terminal (which may be either a terminal of non-base station or the base station) includes a upper layer processor 90, a MAC processor 10, a physical (PHY) processor 50, a MAC/PHY manager 60, an analog processor 70 (analog processors 1 to N), and an antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner. The MAC processor 10, the MAC/PHY manager 60, and the PHY processor 50 correspond to a mode of controller, controlling circuitry or baseband integrated circuit that carries out processing associated with communications with other terminals (including the base station). The analog processor 70 corresponds, for example, to a wireless communication unit or a radio frequency (RF) integrated circuit that transmits and receives signals via the antenna 80. The integrated circuit for wireless communication in accordance with this embodiment includes at least the former of the baseband integrated circuit and the RF integrated circuit. The functions of the communication processing device or the baseband integrated circuit may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as an SRAM or a DRAM, or a non-volatile memory device such as a NAND or an MRAM.

The upper layer processor 90 is configured to carry out processing for the Medium Access Control (MAC) layer associated with the upper layer or layers. The upper layer processor 90 is capable of exchanging signals with the MAC processor 10. As the upper layer, TCP/IP, UDP/IP, and the application layer upper than these two protocols may be mentioned as typical examples but this embodiment is not limited to them. The upper layer processor 90 may include a buffer for exchanging data between the MAC layer and the upper layer or layers. It may also be considered that it may be connectable to a wired infrastructure via the upper layer processor 90. The buffer may be a memory device, an SSD drive, or a hard disk. When the buffer is a memory device, the memory device may be a volatile memory device such as an SRAM or a DRAM, or a non-volatile memory device such as a NAND or an MRAM.

The MAC processor 10 is configured to carry out processing for the MAC layer. As described above, the MAC processor 10 is capable of exchanging signals with the upper layer processor 90. Further, the MAC processor 10 is capable of exchanging signals with the PHY processor 50. The MAC processor 10 includes a MAC common processor 20, a transmission processor 30, and a reception processor 40.

The MAC common processor 20 is configured to carry out common processing for transmission and reception in the MAC layer. The MAC common processor 20 is connected to and exchanges signals with the upper layer processor 90, the transmission processor 30, the reception processor 40, and the MAC/PHY manager 60.

The transmission processor 30 and the reception processor 40 are connected to each other. Also, the transmission processor 30 and the reception processor 40 are each connected to the MAC common processor 20 and the PHY processor 50. The transmission processor 30 is configured to carry out transmission processing in the MAC layer. The reception processor 40 is configured to carry out reception processing in the MAC layer.

The PHY processor 50 is configured to carry out processing for a physical layer (PHY layer). As described above, the PHY processor 50 is capable of exchanging signals with the MAC processor 10. The PHY processor 50 is connected via an analog processor 70 to an antenna 80.

The MAC/PHY manager 60 is connected to the upper layer processor 90, the MAC processor 10 (more specifically, the MAC common processor 20), and the PHY processor 50. The MAC/PHY manager 60 is configured to manage MAC operation and PHY operation in the wireless communication device.

The analog processor 70 includes an analog-to-digital and digital-to-analog (AD/DA) converter and a radio frequency (RF) circuit. The analog processor 70 is configured to convert a digital signal from the PHY processor 50 into an analog signal having a desired frequency and transmit it from the antenna 80, or convert a high-frequency analog signal received from the antenna 80 into a digital signal. It is considered here that although AD/DA conversion is carried out by the analog processor 70, another configuration is also possible according to which the PHY processor 50 has the AD/DA conversion function.

The wireless communication device in accordance with this embodiment has its constituent element (i.e., incorporates) the antenna 80 in one single chip and thereby makes it possible to reduce the mounting area of the antenna 80. Further, in the wireless communication device in accordance with this embodiment, as illustrated in FIG. 1, the transmission processor 30 and the reception processor 40 shares the N antennas 80. By virtue of sharing the N antennas 80 by the transmission processor 30 and the reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, the analog processor 70 converts an analog signal received by the antenna 80 into a baseband signal that can be processed by the PHY processor 50, and further converts the baseband signal into a digital signal. The PHY processor 50 is configured to receive a digital signal that is received from the analog processor 70 and detect its reception level. The detected reception level is compared with the carrier sense level (threshold). When the reception level is equal to or larger than the carrier sense level, the PHY processor 50 outputs a signal indicative of the fact that the medium (CCA: Clear Channel Assessment) is in the busy state to the MAC processor 10 (the reception processor 40 to be more precise). When the reception level is less than the carrier sense level, the PHY processor 50 outputs a signal indicative of the fact that the medium (CCA) is in the idle state to the MAC processor 10 (the reception processor 40 to be more precise).

The PHY processor 50 is configured to carry out decoding processing for the received signal (including demodulation and decoding of error correcting code, etc.), processing of removing a physical header (PHY header) including a preamble, or the like, and extracts a payload. According to the IEEE 802.11 standard, this payload is called physical layer convergence procedure (PLCP) service data unit (PSDU) on the PHY side. The PHY processor 50 delivers the extracted payload to the reception processor 40, and the reception processor 40 handles it as a MAC frame. According to the IEEE 802.11 standard, this MAC frame is called medium access control (MAC) protocol data unit (MPDU). In addition, the PHY processor 50, when it started to receive the reception signal, notifies the fact of having started reception of the reception frame to the reception processor 40, and, when it completed the reception of the reception signal, notifies the fact of having completed the reception to the reception processor 40. Also, the PHY processor 50, when the reception signal has been decoded successfully as the physical packet (PHY packet) (when it does not detect an error), notifies the completion of the reception of the reception signal and delivers a signal indicative of the fact that the medium is in the idle state to the reception processor 40. The PHY processor 50, when it detected an error in the reception signal, notifies the fact that the error has been detected with an appropriate error code in accordance with the error type to the reception processor 40. Also, the PHY processor 50, at the timing at which the medium has been determined to enter the idle state, notifies a signal indicative of the fact that the medium is in the idle state to the reception processor 40.

The MAC common processor 20 performs intermediary processing for delivery of transmission data from the upper layer processor 90 to the transmission processor 30 and for delivery of reception data from the reception processor 40 to the upper layer processor 90. According to the IEEE 802.11 standard, the data in this MAC data frame is called medium access control (MAC) service data unit (MSDU). Also, the MAC common processor 20 receives instructions from the MAC/PHY manager 60 and then converts the instruction into appropriate form of instructions for the transmission processor 30 and the reception processor 40 and outputs the converted instructions to these units.

The MAC/PHY manager 60 corresponds, for example, to station management entity (SME) in the IEEE 802.11 standard. In that case, the interface between the MAC/PHY manager 60 and the MAC common processor 20 corresponds to MAC subLayer management entity service access point (MLME SAP) in the IEEE 802.11 standard, and the interface between the MAC/PHY manager 60 and the PHY processor 50 corresponds to physical layer management entity service access point (PLME SAP) in the IEEE 802.11 wireless local area network (LAN).

It is considered here that although the MAC/PHY manager 60 in FIG. 1 is illustrated on the assumption that the functional unit for the MAC management and the functional unit for the PHY management are configured to be integral with each other, these units may be separately implemented.

The MAC/PHY manager 60 stores Management Information Base (MIB). The MIB stores various pieces of information such as the capability of the device itself and whether various functions are enabled or disabled. For example, information may be stored regarding whether or not the device itself supports UL-OFDMA and, if the device itself supports UL-OFDMA, whether or not the function to implement UL-OFDMA is enabled or disabled. A memory device for storing and managing the MIB may be incorporated in the MAC/PHY manager 60 or separately provided without being incorporated into the MAC/PHY manager 60. When the memory device for storing and managing the MIB is provided separately from the MAC/PHY manager 60, the MAC/PHY manager 60 can refer to the separately provided memory device and rewrite rewritable parameters within the memory device. The memory device may be a volatile memory device such as an SRAM or a DRAM, or a non-volatile memory device such as a NAND or an MRAM. Also, storage devices such as a hard disk and an SSD may be used in place of the memory device. In the base station, these pieces of information of the other terminals that are not a base station can also be obtained by notification from these terminals. In that case, the MAC/PHY manager 60 is adapted to be capable of referring to and rewriting the information regarding the other terminals. Alternatively, the memory device for storing the information on the other terminals may be held and managed separately from the MIB. In that case, either the MAC/PHY manager 60 or the MAC common processor 20 is adapted to be capable of referring to and rewriting the separate memory device. Also, the MAC/PHY manager 60 of the base station may include a selection function for, when implementing UL-OFDMA, selecting the terminals to which the resource units for UL-OFDMA are assigned on the basis of various pieces of information regarding terminals that are not a base station, or on the basis of the requests from the terminals (i.e., selecting the terminals subject to UL-OFDMA of this time). Also, the MAC/PHY manager 60 or the MAC processor 10 may manage the data (transmission) rate applied to the MAC frame and the physical header aimed at transmission. Also, the MAC/PHY manager 60 of the base station may define and manage a supported rate set which is a rate set supported by the base station. The supported rate set may include a rate that should compulsorily supported by the terminal that is connected to the base station and an optional rate.

The MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, Beacon frame may be mentioned. The Beacon frame notifies attribute and synchronization information of a group to form a wireless communication group which is a Basic Service Set (BSS) in the IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports (for example, support of the UL-OFDMA scheme and various capabilities which will be later described, etc.), and negotiation regarding settings of the scheme may be mentioned. The management frame is generated on the basis of the instruction received by the transmission processor 30 from the MAC/PHY manager 60 via the MAC common processor 20.

With regard to the management frame, the transmission processor 30 achieves notifying various pieces of information to other terminals by the management frame. A terminal that is not a base station may notify the type of the terminal itself to the base station by putting in the management frame information regarding such as whether it is an UL-OFDMA-compliant terminal, an IEEE 802.11n-compliant terminal, or an IEEE 802.11ac-compliant terminal. As for this management frame, for example, Association Request frame used in the association process which is one of the procedures for authentication between the terminal and the base station or Reassociation Request frame used in the reassociation process may be mentioned. The base station may notify the information on whether or not it supports UL-OFDMA communication to the terminal that is not the base station by the management frame. As the management frame used for this, for example, Beacon frame and Probe Response frame may be mentioned. The Probe Response frame is a response to the Probe Request frame transmitted by the terminal that is not the base station. The base station may have a function of grouping terminals which are connected to itself. The above-described notification means at the base station may notify to each of the terminals a group ID by the management frame. The group ID is a group identifier of the group to which the terminal itself belongs. As this management frame, for example, Group ID Management frame may be mentioned. The group ID may be, for example, an identifier that expands the concept of a group ID (six bits) defined for DL-MU-MIMO in the IEEE Std 802.11ac-2013 such that it covers a case of UL-OFDMA, or may be a group ID that is defined in accordance with a method different from this.

Also, when designating this group and implementing UL-OFDMA, if there exists any necessary information for determining the resource units used by a terminal that belongs to this group, the base station may notify that information by a predetermined management frame (as will be described later, when the group is designated, the terminal includes the function of acquiring a resource unit based on a technique similar to random backoff procedure).

Here, association ID (AID) is described. The AID is an identifier (terminal identifier) of a terminal assigned by the base station to this terminal in the association process for allowing the terminal to make a connection to the base station and enabling data frame exchange in the BSS under the base station. The association process, specifically, is a process that is successful when an Association Request frame is transmitted from the terminal to the base station and an Association Response frame is transmitted from the base station to the terminal and the terminal Status Code field in the Association Response frame is "0" which represents the success. The communication capability of the transmission terminal is included in both Association Request frame and Association Response frame, by virtue of which both parties that received either of them grasp the communication capabilities of their counterparts. When terminal Status Code field in the Association Response frame is "0" representing the success, the AID is extracted from the AID field (16 bits) in the same frame and it is used as the AID of the transmission destination terminal. In other words, the AID is assigned from the base station to the terminal at this point, and the terminal enters a state where the AID is enabled. In a state where this base station is connected to (have Association with) the terminal, the AID of the terminal is enabled. Meanwhile, when a Disassociation frame is transmitted from the base station to this terminal and this terminal receives it, or when the Disassociation frame is transmitted from this terminal to the base station, the AID of this terminal is disabled (null). It will be appreciated that the AID is null on a terminal that has not had the association process with any base station. It can also be said that the state where the AID is null is a state where the AID is not assigned.

The reception processor 40 has a receiver that receives various types of information via the management frame from other terminals. As one example, the receiver of the base station may receive information associated with compatibility with UL-OFDMA communication from any terminal as a non-base station. Also, it may receive information associated with an adaptable channel width (the maximum available channel width) if this terminal is a legacy terminal (IEEE 802.11a/b/g/n/ac standard-compliant terminal and the like). The receiver of the terminal may receive from the base station information associated with compatibility as to whether or not UL-OFDMA is supported.

The examples of the information to be transmitted and received via the management frame as described above are merely examples and various other types of information can be transmitted and received via the management frame between terminals (including the base station). For example, an UL-OFDMA-compliant terminal may select either or both of a resource unit and a channel that the terminal itself wants to use in the UL-OFDMA transmission from either or both of non-interference channels and non-interference resources based on carrier sense. And information regarding the resource unit, channel, or both of them that have been selected may be notified to the base station. In this case, the base station, on the basis of this information, may perform assignment of the resource units for the UL-OFDMA communication for each of the UL-OFDMA-compliant terminals. It is considered here that the channels used in the UL-OFDMA communication may be all of the channels that are available as the wireless communication system or may be a subset (one or a plurality) of the channels.

The data frame is for use in transmission of data to another terminal in a state where the communication link is established with the other terminal. For example, data is generated in the terminal by an operation of an application by a user, and the data is carried by the data frame. Specifically, the generated data is delivered from the upper layer processor 90, via the MAC common processor 20, and to the transmission processor 30, the data is put into the frame body field by the transmission processor 30, and a MAC header is added to the this frame body field, and thus the data frame is generated. In addition, a physical header is added to the data frame by the PHY processor 50, the physical packet is generated, and the physical packet is transmitted via the analog processor 70 and the antenna 80. Also, when the physical packet is received by the PHY processor 50, the PHY processor 50 performs the processing for the physical layer on the basis of the physical header, and extracts the MAC frame (here, the data frame), and delivers the data frame to the reception processor 40. When the reception processor 40 receives the data frame (recognizes that the received MAC frame is a data frame), the reception processor 40 extracts the information in the frame body field as data, and delivers the extracted data via the MAC common processor 20 to the upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, RTS (Request to Send) frame, CTS (Clear to Send) frame may be mentioned which are exchanged with the other wireless communication device to make a reservation of the wireless medium prior to starting exchange of the management frame and the data frame. Also, as another control frame, delivery confirmation response frame for confirmation of delivery of the received management frame and the data frame may be mentioned. As examples of the delivery confirmation response frame, ACK (Acknowledgement) frame and BA (BlockACK) frame may be mentioned. Since the CTS frame is transmitted as a response to the RTS frame, it can be said that the CTS is a frame that represents a delivery confirmation response. CF-End frame is also one of the control frames. The CF-End frame is a frame that announces the completion of the CFP (Contention Free Period) or the truncation of the TXOP after-mentioned, in other words, a frame permitting other wireless communication devices to access the wireless medium. These control frames are generated by the transmission processor 30. With regard to the control frames (CTS frame, ACK frame, BA frame, etc.) transmitted as a response to the received MAC frame, the reception processor 40 determines whether or not transmission of a response frame (control frame) is necessary, and outputs information necessary for frame generation (type of the control frame, information specified in the RA (Receiver Address) field, and the like) to the transmission processor 30 along with the transmission instruction. The transmission processor 30 generates an appropriate control frame on the basis of the information necessary for generation of the frame and the transmission instruction.

When a MAC frame is transmitted on the basis of CSMA/CA (Carrier Sense Multiple Access with Carrier Avoidance), the MAC processor 10 needs to acquire the access right (transmission right) on the wireless medium. The transmission processor 30, on the basis of carrier sense information from the reception processor 40, measures the transmission timing. The transmission processor 30, in accordance with the transmission timing, gives the transmission instruction to the PHY processor 50, and further delivers the MAC frame thereto. In addition to the transmission instruction, the transmission processor 30 may instruct a modulation method and a coding method to be used in the transmission. In addition to them, the transmission processor 30 may provide an instruction regarding the transmission power. When the MAC processor 10, after having acquired the access right (transmission right), obtained the period of time during which the medium can be occupied (Transmission Opportunity; TXOP), then the MAC processor 10 is allowed to continuously exchange the MAC frames with other wireless communication devices although there is some limitation such as the QoS (Quality of Service) attribute. The TXOP is acquired, for example, when the wireless communication device transmits a predetermined frame (for example, an RTS frame) on the basis of CSMA/CA (Carrier Sense Multiple Access with Carrier Avoidance) and correctively receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that requests transmission of the delivery confirmation response frame is transmitted directly by the unicast (as will be described later, this frame may be a frame in the form of conjunct frames or conjunct payloads) or a management frame that requests transmission of the delivery confirmation response frame is transmitted, and delivery confirmation response frame (ACK frame, BlockACK frame or the like) in response thereto is correctly received. Alternatively, when a frame is transmitted that does not request, for the other wireless communication device, transmission of the delivery confirmation response frame with a period equal to or longer than the time period needed to transmit this frame specified in the Duration/ID field of this frame, then it may be interpreted that with the transmission of this frame, TXOP of the period described in the Duration/ID field has been acquired.

The reception processor 40 is configured to manage the above-described carrier sense information. This carrier sense information includes both Physical Carrier Sense information regarding busy/idle states of the medium (CCA) input from the PHY processor 50 and Virtual Carrier Sense information on the basis of the medium reserve time described in the received frame. If either one of these carrier sense information pieces indicates the busy state, then the medium is regarded as being in the busy state in which transmission is prohibited. It is considered here that in the IEEE 802.11 standard, the medium reserve time is described in the Duration/ID field in the MAC header. The MAC processor 10, when having received a MAC frame that is addressed to other wireless communication devices (that is not addressed to the device itself), determines that the medium is virtually in the busy state from the end of the physical packet including this MAC frame over the medium reserve time. A scheme of this type for virtually determining that a medium is in the busy state, or the term during which the medium is virtually regarded as being in the busy state is called Network Allocation Vector (NAV). It can be said that the medium reserve time represents the length of time period during which suppression of accesses to the wireless medium is instructed, i.e., the length of time period during which accesses to the wireless medium are deferred.

Here, the MPDU may be a frame such that a plurality of MAC frames are conjunct with each other or payload portions of a plurality of MAC frames are conjunct with each other. The former data frame is called A (Aggregated)-MPDU and the latter data frame is called A (Aggregated)-MSDU (MAC service data unit) in the IEEE 802.11 standard. In the case of the A-MPDU, a plurality of MPDUs are conjunct with each other within the PSDU. Also, as a MAC frame, in addition to the data frame, the management frame and the control frame are also eligible for this conjunction. In the case of the A-MSDU, MSDUs which are a plurality of data payloads are conjunct with each other within the frame body of one MPDU. In both cases of the A-MPDU and the A-MSDU, partition information (length information, etc.) is stored in the frame such that the conjunction of the MPDUs and combination of MPDUs can be appropriately separated by the terminal on the reception side. Both of the A-MPDU and the A-MSDU may be used in combination. Also, the A-MPDU may involve not a plurality of MAC frames but one single MAC frame, and also in this case the partition information is stored in the frame. Also, when an A-MPDU or the like is received, responses to the plurality of MAC frames being conjunct are transmitted together. The BA (BlockACK) frame is used as the response in this case in place of the ACK frame. In the following explanations and figures, the notation of MPDU may be used, but it is assumed here that this notation includes the cases of the above-described A-MPDU and the A-MSDU.

According to the IEEE 802.11 standard, several procedures are defined in multiple stages to be taken for a terminal that is not the base station to participate in a BSS (which is called Infrastructure BSS) configured with the base station amongst others and to perform exchange of data frames within the BSS. For example, there is provided a procedure called association, according to which an Association Request frame is transmitted from the terminal that is not the base station to the base station to which the terminal requests the connection. The base station, after having transmitted an ACK frame for the association request frame, transmits an Association Response frame which is a response to the association request frame.

The terminal stores the capability of the terminal itself in the association request frame and transmits this association request frame, and thus can make notification of the capability of the terminal itself to the base station. For example, the terminal may add, to the association request frame, the channel, the resource unit, or both of them that the terminal itself can support, and information for identifying the standard supported by the terminal itself into the association request frame and transmit this association request frame. This information may be also set in the frame transmitted by the procedure called reassociation (reassociation) to reconnect to another base station. In this procedure of reassociation, a Reassociation Request frame is transmitted to the other base station to which reconnection is requested from the terminal. The other base station, after having transmitted the ACK frame in response to the reassociation request frame, transmits a reassociation response which is a response to the reassociation request frame.

As the management frame, in addition to the association request frame and the reassociation request frame, a beacon frame, a probe response frame, etc. may be used. The beacon frame is basically transmitted by the base station, and is capable of storing parameter notifying the capability of the base station itself along with the parameters indicating the attributes of the BSS. In view of this, as the parameter notifying the capability of the base station itself, the base station may be adapted to add the information on whether or not UL-OFDMA is supported. Also, as the other parameter, information on the supported rates of base station may be notified. The supported rates may include mandatory rates required to be supported by the terminals participating in the BSS formed by the base station and an optional rate. The probe response frame is a frame transmitted from the terminal that transmits the beacon frame in response to a probe request frame received. The probe response frame is basically the one that notifies the same content as that of the beacon frame, and the base station, when it uses the probe response frame, is also capable of notifying the capability of the station itself to the terminal that transmitted the probe request frame. By making this notification to the UL-OFDMA-compliant terminal, an operation may be performed according to which the terminal, for example, enables the function of the UL-OFDMA communication of the terminal itself.

It is considered here that the terminal may notify the information regarding the rates available on the device itself from among the supported rates of the base station rate as the information for notifying the capability of the device itself to the base station. Meanwhile, it is considered that with regard to the mandatory rates from among the supported rates, a terminal that is connected to the base station has the capability of executing the mandatory rates.

It is considered here that if notification of some piece or pieces of information among the pieces of information mentioned above leads to definition of the content of another piece or other pieces of information, then notification of the other piece or pieces of information may be omitted. For example, suppose a case where a terminal is always an UL-OFDMA-compliant terminal if a capability that is compliant with a new standard or specifications is defined and as long as the terminal is compliant with that capability or specifications. In this case, as the above certain piece or pieces of information, presence of the capability to be compliant with the standard or specification is notified, and as the other piece or pieces of information, notification of the fact that the terminal is an OFDMA-compliant terminal does not need to be explicitly performed.

Figure 4:
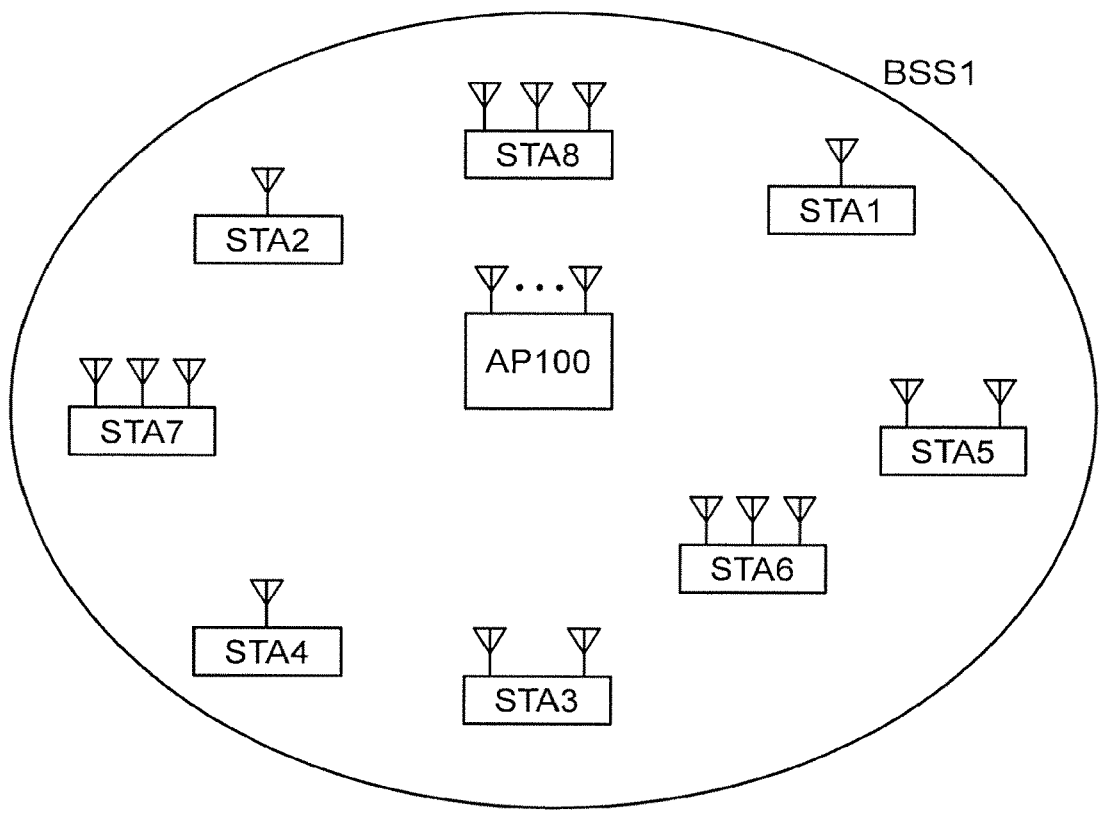
FIG. 4 is a diagram illustrating a wireless communication group including a base station and a plurality of terminals.

FIG. 4 illustrates a wireless communication system in accordance with this embodiment. This system includes the base station (AP: Access Point) 100 and a plurality of terminals (STA: STAtion) 1 to 8. The BSS (Basic Service Set) 1 is formed by the base station 100 and the terminals 1 to 8 operating under the base station 100. This system is a wireless LAN system compliant with the IEEE 802.11 standard using CSMA/CA (Carrier Sense Multiple Access with Carrier Avoidance). It is considered here that legacy terminals (IEEE 802.11a/b/g/n/ac standard-compliant terminals, etc.) other than the terminals (UL-OFDMA terminals) in accordance with this embodiment may exist within the BSS 1.

Figure 5A:
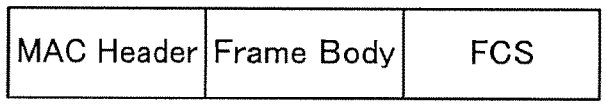
FIGS. 5(A) and (B) are a diagram illustrating a basic exemplary format of a MAC frame.
Figure 5B:
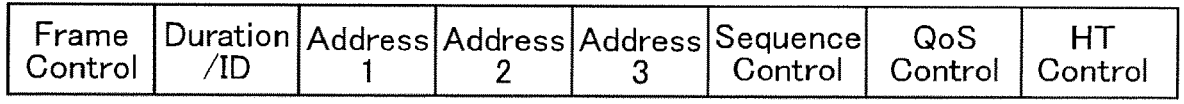

FIG. 5(A) illustrates the basic exemplary format of the MAC frame. The data frame, the management frame, and the control frame in accordance with this embodiment are based on a frame format of this type. This frame format includes the fields of MAC header, Frame body, and FCS. The MAC header includes, as illustrated in FIG. 5(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 5 may exist. For example, an Address 4 field may further exist. Also, an RU/AID field which will be described later may exist in the MAC header or the frame body field.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame. Meanwhile, as will be described later, one of the features of this embodiment is that the Address 1 and Address 2 fields are to be used in a manner different than the one that has been described here.

As described above, two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a BA frame or a BAR frame within the control frame, or a beacon frame within the management frame is made by the Subtype field. The trigger frame which will be described later may also be discriminated by the combination of the Type and the Subtype. It is likely that the trigger frame is categorized as the control frame.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector). The QoS field is used to carry out QoS control to carry out transmission with the priorities of the frames taken into account.

Figure 6:
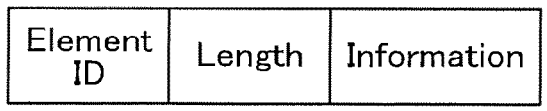
FIG. 6 is a diagram illustrating an exemplary format of an information element.

In the management frame, an information element (Information element; IE) to which a unique Element ID (IDentifier) is assigned is set in the Frame Body field. One or a plurality of information elements may be set in the frame body field. The information element has, as illustrated in FIG. 6, the fields of an Element ID field, a Length field, and an Information field. The information element is discriminated by the Element ID. The Information field is adapted to store the content of the information to be notified, and the Length field is adapted to store the length information of the information field.

Frame check sequence (FCS) information is set in the FCS field as a checksum code for use in error detection of the frame on the reception side. As an example of the FCS information, CRC (Cyclic Redundancy Code) may be mentioned.

Figure 7:
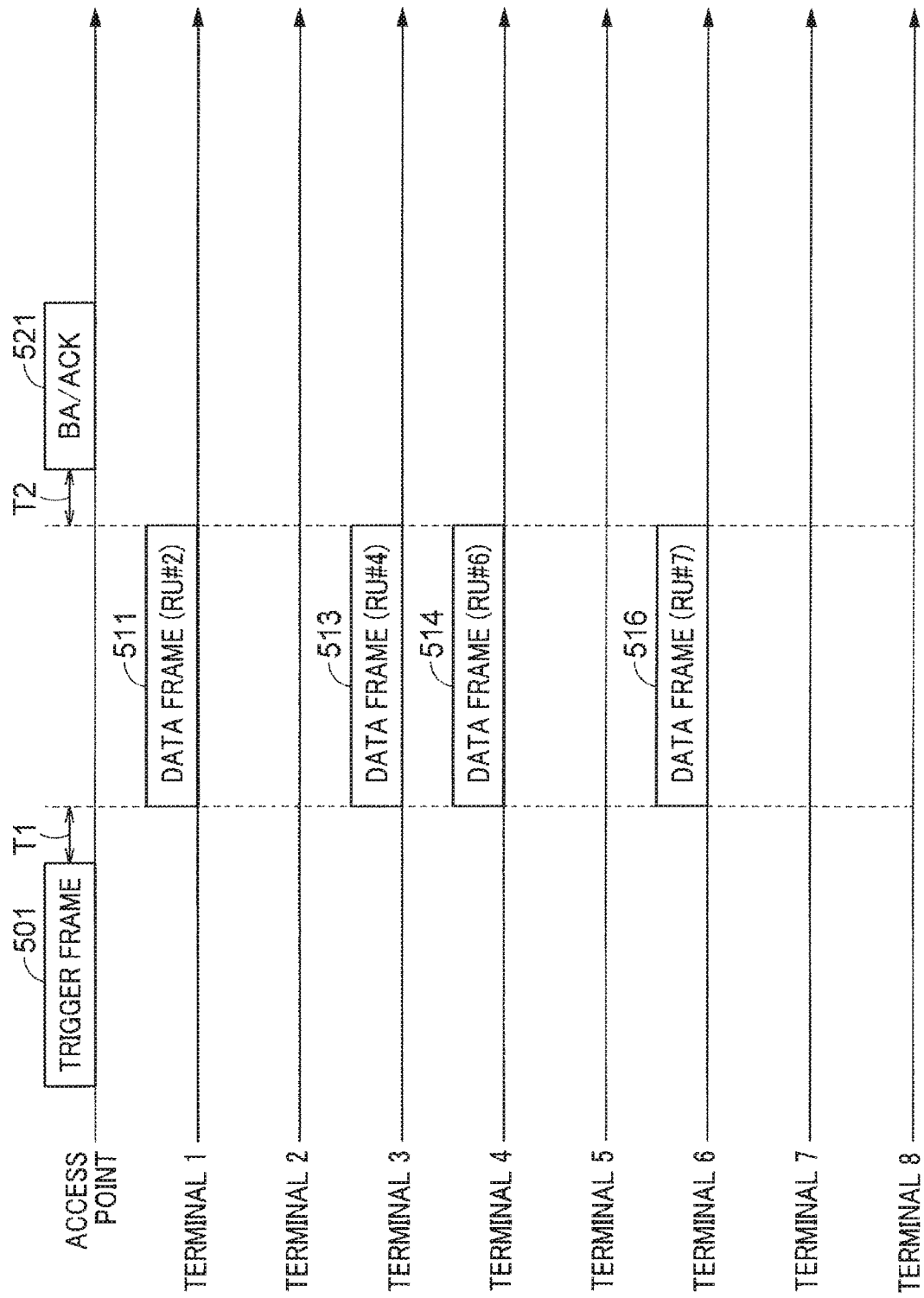
FIG. 7 is a diagram illustrating an operation sequence in accordance with the present invention.

FIG. 7 illustrates an exemplary operation sequence of the base station (AP) 101 and a plurality of terminals including the terminals (STAs) 1 to 8 in accordance with this embodiment. The terminals 1 to 8 are UL-OFDMA-compliant terminals.

In this exemplary operation sequence, as its premise, CSMA/CA-based communications are individually carried out (single user communications) between the base station and all or part of the terminals 1 to 8. In the single user communications, communications are carried out between the base station and the terminals, for example, on one channel with the basic channel width (for example, 20 MHz). As one example of the single user communications, when data for uplink transmission is held by the terminal, the right to access the wireless medium is acquired in accordance with CSMA/CA. As a result, the terminal carries out carrier sense for the carrier sense time (waiting time) between the DIFS/AIFS[AC] and a randomly defined back-off time, and when it has been determined that the medium (CCA) is in the idle state, the terminal acquires the right to access to transmit, for example, one frame. The terminal transmits the data frame (more specifically, a physical packet including the data frame). When the base station has received this data frame successfully, then the base station returns an ACK frame (more specifically, a physical packet including the ACK frame) which is a delivery confirmation response frame after the elapse of SIFS time after completion of reception of the data frame. The terminal upon reception of the ACK frame determines that the transmission of the data frame has been successful. It is considered here that the data frame to be transmitted to the base station may be an aggregation frame (A-MPDU, etc.), and the delivery confirmation response frame by which the base station respond may be a BA frame (this also applies to the following explanations). It is considered here that the DIFS/AIFS [AC] time refers to either the DIFS time or the AIFS [AC] time. When it is not QoS-compliant, the DIFS/AIFS [AC] time refers to the DIFS time. When it is QoS-compliant, the DIFS/AIFS [AC] time refers to the AIFS [AC] time which is defined in accordance with the access category (AC) (to be later described) of the data to be transmitted.

The base station decides to start UL-OFDMA at a predetermined timing. This example contemplates a case where UL-OFDMA transmission is performed by the same channel as that of the single user communication (one channel with the basic channel width of 20 MHz). In other words, it is considered in this example that the UL-OFDMA transmission is performed using a plurality of resource units defined within the channel with the basic channel width of 20 MHz. Nevertheless, it is also possible to use other channel widths such as 40 MHz, 80 MHz, etc. to perform the UL-OFDMA transmission.

Figure 8:
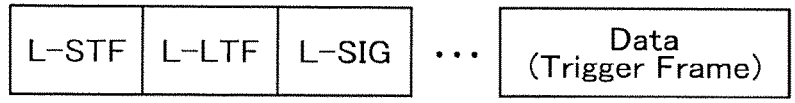
FIG. 8 is a diagram illustrating an exemplary format of a physical packet including a trigger frame.

When the base station decides to start the UL-OFDMA transmission, the base station transmits the trigger frame 501 of the UL-OFDMA transmission (more specifically, a physical packet including the trigger frame). The trigger frame 501 is transmitted by the same channel as that of the single user communication which is the channel with the basic channel width. The physical packet including the trigger frame is, as one example, a packet in which a physical header is added to the beginning of the trigger frame. The physical header is, as one example, as illustrated in FIG. 8, includes L-STF (Legacy-Short Training Field), L-LTF (Legacy-Long Training Field), and L-SIG (Legacy Signal Field) defined in the IEEE 802.11 standard. The L-STF, L-LTF, and L-SIG fields are fields that can be recognized by terminals compliant with legacy standards, for example, such as IEEE 802.11a, in which pieces of information are stored such as signal detection, frequency correction (propagation path estimation), and data rate, respectively. Fields other than those mentioned herein (for example, fields that terminals compliant with legacy standards cannot recognize but UL-OFDMA-compliant terminals can recognize) may be included.

The trigger frame 501 may be a frame that can be received and decoded by legacy terminals as well as the UL-OFDMA-compliant terminals. It is considered here that when the base station attempts to transmit the trigger frame, the base station acquired the access right in accordance with CSMA/CA in advance. Acquisition of the access right proceeds in the same or similar manner as in the terminals described above. There are a plurality of frame formats and usage rules (rules of interpretation) for the trigger frame 501 in this embodiment, and the operations of the terminal also vary depending on either one of them at the time of receiving the trigger frame 501. In the explanation of this sequence, a typical example of the operation is described and variant operations will be later described. It is assumed here that the trigger frame 501 includes, as one example, information identifying the plurality of resource units that can be used in the UL-OFDMA transmission and information identifying a plurality of terminals that become candidates for the UL-OFDMA transmission. The above information identifying the resource units identifies, for example, all or part of the plurality of resource units defined within the channel. The above information identifying the plurality of terminals that become the candidates includes, for example, at least one group ID or individual identifiers of the plurality of terminals (AID or MAC address, etc.). Examples other than those mentioned herein can also be considered.

The trigger frame 501 transmitted from the base station is received by the terminals 1 to 8. The terminals 1 to 8 decodes the trigger frame 501, and determines whether or not the terminal itself belongs to the group having the group ID designated by the trigger frame 501. It is considered here that the terminal is notified from the base station about the group ID of the group to which the terminal itself belongs, at the time of the association process or at a predetermined timing after the association process. It may receive notification of the correspondence between the terminals other than the terminal itself and the groups. When the terminal itself belongs to the group having the group ID designated by the trigger frame and the terminal itself holds the data for uplink transmission, then the terminal itself randomly acquires a resource unit or units to be used by the terminal itself from among resource units designated by the trigger frame 501 based on a technique similar to random backoff procedure. A terminal that does not hold the data for the uplink transmission does not need to make this acquisition, but may be adapted to make the same acquisition. The number of resource units to be acquired may be given in advance or may be designated by the trigger frame 501, or may be recognized by any other methods. It is considered here that each of the terminals belonging to the above-described group can acquire one resource unit at most.

It is assumed here that n resource units 1 to n are designated in the trigger frame 501 as the information identifying the resource units. The resource units 1 to n may be all of the resource units defined within the channel used in UL-OFDMA or may be part of these resource units. The resource units 1 to n may, for example, be discriminated by RU #1 to RU #n which are their individual identifiers or numbers. Another configuration may also be considered in which an identifier that identifies a set of resource units is independently defined and one or more identifiers of the sets are designated by the trigger frame 501. In this case, terminal recognizes the available resource units by the identifier of the set.

In this example, it is assumed that a group to which the terminals 1, 3, 4, and 6 commonly belong is designated from among the terminals 1 to 8 and the group to which at least one of the terminals 2, 5, 7, and 8 belongs was not designated. As one example, it is assumed that a group including the terminals 1, 3, 4, and 6 and a group including the terminals 2, 5, 7, and 8 are defined by the base station, and only the group ID of the former group has been designated. And it is assumed that the terminals 1, 3, 4, and 6 individually holds the data for uplink, all of these terminals acquired the right to select the resource units, and the resource units 2, 4, 6, and 7 have been randomly selected from among the resource units 1 to n. The terminals 1, 3, 4, and 6 transmit to the base station the data frames 511, 513, 514, and 516 (more specifically, the physical packets including these data frames) including data for uplink transmission after the elapse of a predetermined time period T1 after completion of the reception of the trigger frame 507. The transmission of the data frames 511, 513, 514, and 516 is performed using the resource units 2, 4, 6, and 7 selected by the terminals 1 to 4, respectively.

The predetermined time period T1 is, as one example, an SIFS (Short Inter-frame Space) time (=16 µs) which is a time interval between frames defined in the MAC protocol specification of the IEEE 802.11 wireless LAN, or other time intervals (IFS) defined in advance may be used. The predetermined time period T1 may be defined by the system or the specification, or may be notified in advance by another method such as the beacon frame or any other management frames. As another example, the value of the predetermined time period T1 may be stored in a predetermined field of the trigger frame 501 and the terminals 1 to 4 may acquire the value of the predetermined time period T1 from the predetermined field.

The transmission timings of the data frames transmitted by the terminals 1, 3, 4, and 6 are synchronized with each other, and thus the UL-OFDMA transmission is executed. It is considered here that when the terminal makes an operation to select the resource unit though there is no data to be uplink-transmitted, then this terminal may transmit a Null Packet which is a frame having a predetermined format, for example, a frame that includes physical and MAC headers but does not include a data field. Alternatively, this terminal may be adapted to select the resource unit but does not perform any transmission operation. The base station, when having received the Null Packet, may determine that this terminal did not have any data to be transmitted.

The base station receives the data frames 511, 513, 514, and 516 (more specifically, the physical packets including the data frames) transmitted in accordance with OFDMA from the terminals 1, 3, 4, and 6. The base station receives the data frames 511, 513, 514, and 516 by the resource units 2, 4, 6, and 7, respectively. Since transmission of data frames is not performed from any terminals in the other resource units, the base station does not perform the reception of the data frame in other resource units, either.

When the base station correctly receives the data frames transmitted from the terminals 1, 3, 4, and 6, the base station transmits the delivery confirmation response frames 521 to the terminals 1, 3, 4, and 6 after the elapse of a predetermined time period T2 after reception of each data frame. The predetermined time period T2 is, as one example, an SIFS (Short Inter-frame Space) time (=16 µs) which is a time interval between frames defined in the MAC protocol specification of the IEEE 802.11 wireless LAN, or other time intervals (IFS) defined in advance may be used.

As the transmission of the delivery confirmation response frame 513, the BA frame is transmitted by the resource unit by which respective data frame was received for each of the terminals 1, 3, 4, and 6. When the data frame transmitted to the base station includes not an A-MPDU but a conventional (single) MPDU, an ACK frame may also be used in place of the BA frame (it is considered here that it is possible to return a BA frame in the case of conventional MPDU). In this manner, transmission of the BA (or ACK) frames by respective resource units for each of the terminals 1, 3, 4, and 6 corresponds to transmission of the delivery confirmation response frames by downlink OFDMA. In this case, each terminal receives the BA (or ACK) frame by its own resource unit (reception filters are set such that the signals can be received in this manner in units of the resource units). As another method, BA frames (or ACK frames) can be transmitted to the terminals 1, 3, 4, and 6 by downlink MU-MIMO. The downlink MU-MIMO is defined by the IEEE 802.11ac standard.

Further, as another method, a single frame that includes all of the delivery confirmation responses for the terminals 1, 3, 4, and 6 may be transmitted with the channel width band (single user transmission). In this case, this frame may be called a Multi-STA BA frame. As a specific configuration, for example, Multi-TID BA frame defined by the IEEE 802.11 standard may be diverted. As one example, the BA information fields of the Multi-TID BA frame are arranged in the number equal to the number of the terminals and the identifier of the terminal (for example, AID (Association ID) or part of the AID) is set in the reserve field in the TID information subfield of each BA information field. Values of the Block Ack Starting Sequence Control subfield and Block Ack Bitmap subfield of the of each BA information field should be set in a conventional manner in accordance with the data frames 511, 513, 514, and 516 to which the delivery confirmation responses should be returned. A multicast address of the group to which all of the terminals 1, 3, 4, and 6 belong or the broadcast address should be set in the RA (receiver address) of the Multi-STA BA frame. By this setting, the BA can be notified to a plurality of terminals by one single frame. Also, as the Subtype of the Frame Control field, a new value may be defined.

When ACK frames are returned to the terminals 1, 3, 4, and 6 instead of BA frames, identifiers of the terminals are set in some fields of the reserve fields within the TID information subfield of each BA information field, and a part of the remaining fields of the reserve fields are enabled (set to 1(s)). In addition, when this bit is or these bits are enabled, the Block Ack Starting Sequence Control subfield and the Block Ack Bitmap subfield are omitted (do not exist). By virtue of this, ACKs of the plurality of terminals can be notified to the terminals by one single frame. The other example will be to use the partial state operation to cover the corresponding sequence number in the Block Ack Bitmap subfield. The examples described herein are merely examples and existing frames other than the Multi-TID BA frame may be diverted, or a new frame may be defined without diverting the existing frames.

Although the above explanation illustrates an example where the delivery confirmation response frames 521 are transmitted at one time to the terminals 1, 3, 4, and 6, a method is also possible that returns BA frames or the ACK frames in a sequential manner to terminals 1, 3, 4, and 6 one by one. For example, it is also possible that, when the BA frames are returned in a sequential manner, a BA frame is returned to a predetermined terminal (for example, the terminal 1) after the elapse of SIFS time after completion of the reception of the data frame, BAR frames are received from the remaining terminals one by one and, as responses thereto, BA frames are transmitted. Alternatively, with regard to the remaining terminals, BA frames may be transmitted from the base station without reception of the BAR frames and in response thereto the ACK frame may be received at the base station. It is also possible that the BA frames or ACK frames are returned in accordance with methods other than the one described herein.

After transmission of the delivery confirmation response frame 521 by the base station, the same or similar sequence starting the transmission of the trigger frame from the base station may be repeatedly performed.

In the above-described exemplary operation, the terminal that is designated by the group ID by the trigger frame and having a right to select a resource unit randomly selects the resource unit from among the plurality of resource units designated by the trigger frame. As another operation, an operation is also possible according to which the base station individually designates by the trigger frame the resource units on a per-terminal basis, and the terminal designated by the trigger frame selects the resource unit designated by the trigger frame. For example, the identifiers (AIDs, etc.) of the terminals 1, 3, 4, and 6 are designated by the trigger frame, and the identifiers of the resource units 2, 4, 6, 7 are individually designated for each of these terminals. By virtue of this, a sequence that is the same or similar to that of FIG. 7 is performed. It may also be considered that several consecutive resource units are assigned to the same terminal. Also, an operation that combines both of these operations (random selection and individual designation of the resource units) is also possible. Also, it may be further considered that the resource units are designated, by the trigger frame, for terminals that are yet to be connected to the base station by including these terminals as being eligible for the UL-OFDMA. The following explains in more detail the exemplary configuration and usage (exemplary interpretation) of the trigger frame 501 and the operations of the base station and the terminals in accordance with the exemplary configuration for realizing these operations.

Figure 9A:
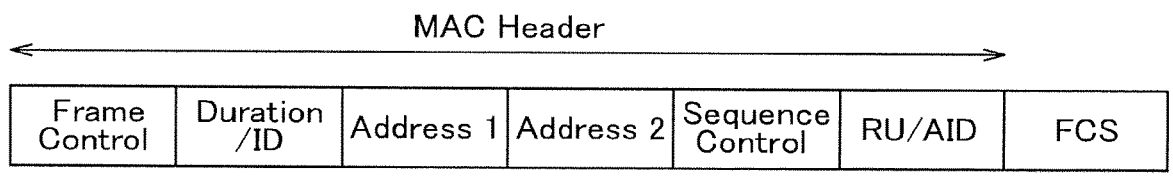
FIGS. 9(A) and 9 (B) are diagrams illustrating an exemplary format of the trigger frame.
Figure 9B:
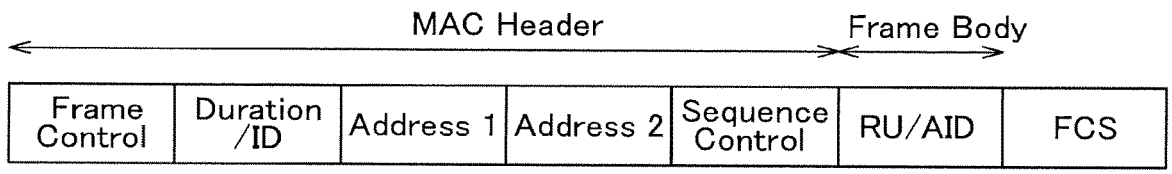

FIG. 9(A) illustrates an exemplary configuration of the trigger frame 501. An RU/AID field is added to the MAC header of the MAC frame illustrated in FIG. 5 whilst some of the fields such as the Address 3 field, etc. are deleted. Nevertheless, all or part of these deleted fields may exist in the frame configuration of FIG. 7. FIG. 9(B) is an example of the case where the RU/AID field exists not in the MAC header but in the frame body field. When the RU/AID field is provided in the frame body field and if the trigger frame 501 is a management frame, then, as illustrated in FIG. 6, as the information element, it may be considered to provide the RU/AID field. If the frame is a control frame or a data frame, then the RU/AID field should be added to the frame body field in a form that allows the field to be identified. In the following explanations, unless there is the need of particular distinction, whether the RU/AID field exists in the MAC header or the frame body field does not affect the applicability of the explanations.

Figure 10:
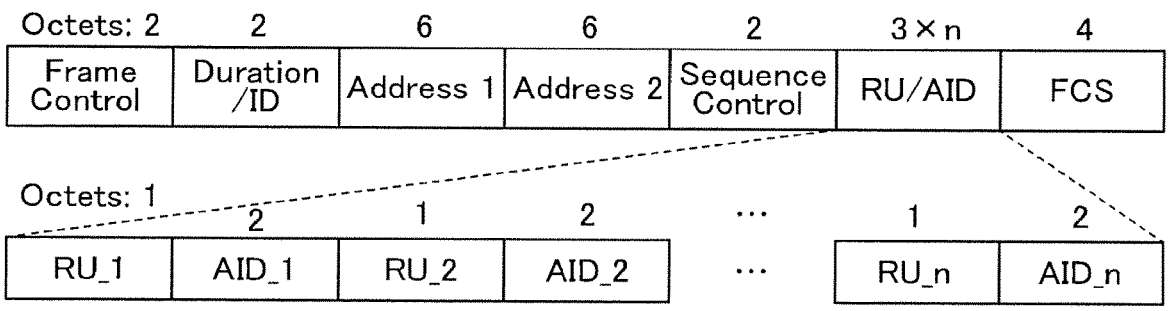
FIG. 10 is a diagram illustrating an exemplary configuration of an RU/AID field in the trigger frame.

FIG. 10 illustrates an exemplary configuration of the RU/AID field of the trigger frame and examples of the field lengths. The field lengths illustrated herein are merely examples and other values may be used. For example, the field lengths are illustrated here in units of octets (8 bits), but such an illustration in units of octets is not essential. The symbol "3×n" represents 3 multiplied by n.

The RU/AID field includes n pairs of an RU field (RU_1 to RU_n) and an AID field (AID_1 to AID_n). As basic usage of this frame format, designation of the resource units and designation of the terminals to which the resource units are assigned are carried out using the RU field and the AID field. The identifier of the resource unit is specified by the RU field, and the identifier (here, the AID) of the terminal to which the resource unit is assigned is specified by the AID field. By virtue of this, the terminals are designated for each of the resource units and each of the terminals uses the designated resource unit. Here, the Type of the frame control field is set as "Control" or "Management" whilst a new value is defined for the Subtype in accordance with the trigger frame. The Type does not need to be "Control" or "Management" but may be set as "Data." In this case, it may be considered that a field notifying whether or not it is a trigger frame is separately provided in the MAC header in place of defining a new value for the Subtype, the bit is set in this field, and thereby notification of the fact that it is the trigger frame is performed. In the Duration/ID field, the length of the period is designated during which exclusive use of the wireless medium should be allowed from the end of the trigger frame. For example, a length of time until the end of the delivery confirmation response frame is designated. Values of the Sequence Control field and the FCS field should be set in a conventional manner. In the Address 1 field, a broadcast address or a multicast address should be set as an RA. Address 2 field, the MAC address (BSSID) of the base station should be set as TA. It is considered here that the value n (the number of pairs of the RU field and the AID field) may be a fixed value or a variable value. When it is a variable value, then a field defining the value n may be provided at the beginning of the RU/AID field, or a field notifying the end of the RU/AID field may be provided. The field notifying the end may be a special value that is not found in the combination of the identifier of the resource unit and the AID.

In the following, examples are illustrated where the frame formats having the configuration of the RU/AID field of this type are used, the terminal group is designated by the group ID as illustrated in FIG. 7, and resource units are acquired by the terminals belonging to this group ID based on a technique similar to random backoff procedure to perform the frame transmission.

First Example

In this case as well, identifiers of the available resource units are set in the RU fields (RU_1 to RU_n). In the example of FIG. 10, there exist n RU fields, and identifiers of the corresponding resource units are set in these RU fields. Meanwhile, predetermined values are set in the n AID fields (AID_1 to AID_n) in the first example.

Meanwhile, the Type of the frame control field is set as "Control" or "Management," and a new value is defined for the Subtype in accordance with the trigger frame. Type does not need to be "Control" or "Management" but may be set as "Data." In this case, it may be considered that a field notifying whether or not it is a trigger frame is separately provided in the MAC header in place of defining a new value for the Subtype, and the bit is set in this field, and thereby notification of the fact that it is the trigger frame is performed. In the Duration/ID field, the length of the period is designated during which exclusive use of the wireless medium should be allowed from the end of the trigger frame. For example, a length of time until the end of the delivery confirmation response frame is designated. Values of the Sequence Control field and the FCS field should be set in a conventional manner.

The group ID of the group to which candidate terminals (terminals 1, 3, 4, and 6 in the example of FIG. 7) belong is set in the Address 1 field. Since, in normal cases, an RA (unicast address, broadcast address, or multicast address) is set in the Address 1 field, it is an operation different than the normal operation to set a group ID thereto. As a result, it is necessary to notify the fact that the group ID is set in the Address 1 field. In view of this, the MAC address (BSSID) of the base station with the Individual/Group bit (bit of a particular location) converted into 1 is set in the Address 2 field. Since a TA is set in the Address 2 field in normal cases, a normal operation is to set the MAC address (BSSID) of the base station. Here, in order to notify the fact that a group ID is set in the Address 1 field, the MAC address (BSSID) of the base station with the Individual/Group bit converted into 1 is set therein. The Individual/Group bit is the eighth bit of the MAC address (when the MAC address is transferred, it is transmitted in units of octets from its beginning, and the least significant bit is transmitted first among the bits in one octet, so that the Individual/Group bit is the first bit in transfer of the MAC address), and the value of the Individual/Group bit for the MAC address of a terminal (including a base station) is 0. It is considered here that the value is 1 in the case of the broadcast address or multicast address. In view of this, the fact that a group ID is set in the Address 1 field is notified to the terminal by converting this Individual/Group bit from 0 to 1 (since in normal cases the trigger frame is transmitted from the base station, the TA to be set in the Address 2 field is the MAC address of the base station and the fact is relied on that the Individual/Group bit is 0). Hence, since Individual/Group bit of the Address 2 field is 1, the terminal is allowed to determine that the group ID is set in the Address 1 field and determine that the transmitter address of the trigger frame takes a value equal to the Individual/Group bit of the bit sequence of the Address 2 field whose 1 is cleared to 0. Accordingly, as the RA at the time of transmission of the data frame by the terminal, it is possible to use the bit sequence of the Address 2 field with the Individual/Group bit cleared to 0 (i.e., the MAC address of the base station).

It is considered here that the value n (the number of pairs of the RU field and the AID field) may be a fixed value or a variable value. When it is a variable value, then a field defining the value n may be provided at the beginning of the RU/AID field, or a field notifying the end of the RU/AID field may be provided. The field notifying the end may be a special value that is not found in the combination of the identifier of the resource unit and the AID.

The terminal that has received the trigger frame specified in the above-described manner recognizes the fact that the trigger frame has been received, for example, from the values of the Type and the Subtype of the frame control field. Since the Individual/Group of the Address 2 field is set to 1, it recognizes the fact that the group ID is set in the Address 1 field and reads the group ID set in the. Address 1 field. It is determined whether or not the terminal itself belongs to the group indicated by the group ID. If the terminal itself does not belong to the group, the trigger frame is discarded and the process is terminated. If the terminal itself belongs to the group indicated by the group ID, the RU/AID field is checked. And the resource units indicated by the identifiers set in the n RU fields are recognized as the available resource unit candidates. The n AID fields are ignored. The terminal, for example, subtracts the number of the available resource unit candidates from a backoff counter which was randomly selected and if the result is equal to or less than zero, it randomly selects the resource unit to be used by the terminal itself from among the available resource unit candidates. It is considered here that one single resource unit is to be selected, but, as described above, a plurality of resource units may be selected. Any methodology can be relied on for the random selection. For example, a random number generator that generates numerical value with a predetermined number of digits may be used to identify the resource unit having the number obtained by dividing the random number by n and adding 1 to the remainder. In this case, when the value of the remainder is zero, then the resource unit 1 is selected. If the value of the remainder is n−1, then the resource unit n is selected. The example described herein is merely an example and it will be appreciated that other methods may be used. The terminal uses the randomly selected resource unit and transmits the data frame as described above. It is considered here that the RA (the value of the Address 1 field) of the data frame is the MAC address (BSSID) of the base station, and the TA (the value of the Address 2 field) is the MAC address of the terminal itself.

In accordance with the above-described first example, since only the terminals that belong to the group designated by the group ID become the UL-OFDMA candidate terminals, it is made possible to reduce the likelihood of overlapping of the randomly selected resource units between terminals more significantly than a case where all of the terminals that have received the trigger frames become the candidate terminals. It is considered here that when the same resource unit is selected by a plurality of terminals, signal interference occurs within the resource unit at the base station, which leads to failure in receiving the frames from these terminals.

Second Example

The second example differs from the first example in the setting of the n AID fields and in the operation of the terminal. The difference with respect to the first example is explained below. Unused values that are not used as an AID, or AIDs assigned to the terminal are set in the n AID fields. The "unused value that is not used as an AID" refers to a value that is out of the range of the AID values that the base station can assign. For example, when the base station uses fourteen bits out of the two octets (16 bits) to represent the AID, if the range of the values that the base station can assign is not less than 1 and not larger than 2007, then the fourteen bits from the two octets (16 bits) of the AID field (the zeroth to thirteenth bits) are all cleared to 0 or set to a value within the range from 2008 to 16383. Fixed values are set to the fourteenth and fifteenth bits (for example, "11"). It is considered here that the exemplary setting of the unused value of the AID as described herein is similar to the method defined in the IEEE 802.11 standard which uses the reserved area of the Duration/ID field (see IEEE Std 802.11™-2012, Table 8-3). When the terminals are allowed to randomly select the resource units, an unused value that is not used as an AID is set in the corresponding AID field. Meanwhile, when the resource units to be used by the terminals are designated, AIDs assigned to the terminals are set in the corresponding AID fields. When unused values that are not used as an AID are set in all of the n AID fields, n values set in these fields may and may not be a common value. The terminal determines whether or not the value of the AID field is an "unused value that is not used as an AID." When the "unused value that is not used as an AID" (in the above-described example, a case of the bits whose zeroth to thirteenth bits indicate 0 or a value equal to or larger than 2008 and whose fourteenth and fifteenth bits indicate "11"), then the terminal determines that the resource unit is available. When it is a value that can be used as the AID (in the above-described example, a case of bits whose zeroth to thirteenth bits indicate a value from 1 to 2007 and whose fourteenth and fifteenth bits indicate "11"), the resource unit determines whether or not this AID is an AID of the terminal itself. When it is the AID of the terminal itself, then it is determined that use of this resource unit is designated for the terminal itself by the base station. When it is not the AID of the terminal itself, it is determined that this resource unit cannot be used by the terminal itself. The terminal, when there is any resource unit designated for the terminal itself, selects this resource unit. When the number of the resource units required for transmission is a plural number (H units) and the number of the designated resource units is less than the value H, then resource unit or units in the number equal to the difference should be randomly selected from among available resource units.

In accordance with the above-described second example, it is made possible to restrict the UL-OFDMA candidate terminals to a particular group or groups and designate the resource units used by the terminals on a per-terminal basis. By virtue of this, for example, when the terminal uses a plurality of resource units, it is made possible to designate some of the resource units by the base station while leaving the remaining resource units randomly selected. With regard to the resource units designated by the base station, these resource units are never used by other terminals, so that no interference occur between the terminals by that resource unit in the base station, and more reliable communications can be expected.

Third Example

In the second example, unused values that are not used as an AID, or AIDs assigned to the terminals are set in the AID fields. In this example, a value that is not assigned as an AID, or AIDs assigned to the terminals are set. The difference from the second example is explained. The values that are not assigned as an AID includes unused values that is not used as an AID and further includes values which fall within the range that can be assigned by the base station as AIDs but are yet to be assigned as the AIDs. When the base station notifies a list of the terminals and the AIDs to each terminal, in this method as well, the same or similar operation as that of the second example can be effectuated. Specifically, the base station, when it makes the terminals randomly select the resource units, sets the values that are not assigned as an AID in the corresponding AID fields. Meanwhile, when the base station designates the resource units to be used by the terminals, the AIDs assigned to the terminals are set in the corresponding AID fields. The terminal determines whether or not a value of an AID field is "a value that is not assigned as an AID" using the above list. When it is "a value that is not assigned as an AID," then the terminal determines that the corresponding resource unit is available. When it is a value that has already been assigned as an AID, the terminal determines whether or not this value is the AID of the terminal itself. When it is the AID of the terminal itself, then it is determined that the use of this resource unit is designated for the terminal itself by the base station. When it is not the AID of the terminal itself, it is determined that this resource unit cannot be used by the terminal itself. The terminal, when there is any resource unit designated for the terminal itself, selects this resource unit. When the number of the resource units required for transmission is a plural number (H units) and the number of the designated resource units is less than the value H, then resource unit or units in the number equal to the difference should be randomly selected from among available resource units.

In accordance with the above-described third example, the same or similar effect as that in the second example can be obtained.

Fourth Example

In the fourth example, the base station sets in the AID-fields the AIDs of the terminals for which use of the corresponding resource blocks are prohibited among the terminals that belong to the group of the group ID, or sets in the AID fields unused values that are not used as an AID. The difference from the first to third examples is explained. When use by a particular terminal or terminals should be prohibited but use by any one of the remaining terminals should be allowed, the AIDs of the terminals that should be prohibited from the use is set in the AID fields. When use by any one of the terminals that belong to the group of the group ID should be allowed, then the unused values that are not used as an AID are set. In place of the unused values that are not used as an AID, in the same manner as in the third example, values that are not assigned as an AID may be used. The terminal determines that the resource unit with the AID of the terminal itself set in the AID field cannot be used by the terminal itself. The terminal determines that the resource unit for which the unused value that is not used as an AID (or a value that is not assigned as an AID) is set is available. The terminal randomly selects the resource unit to be used by the terminal itself from among the available resource units.

In accordance with the above-described fourth example, it is made possible to prohibit use of a certain resource unit or units by a particular terminal or terminals and allow other terminals to randomly select the resource units.

Fifth Example

The fifth example differs from the first to fourth example in its mode of notification of the fact that the group ID is set in the Address 1 field of the trigger frame.

It is considered here that the reason why it is necessary to notify the fact of the group ID being set in the Address 1 field is as follows: In normal cases a unicast address, a broadcast address, or a multicast address is set in the Address 1 field and setting of a group ID is not expected. Accordingly, it is necessary to make it possible to discriminate the fact that a group ID is set in the Address 1 field from the fact that a broadcast or multicast address or the like is set.

Figure 11:
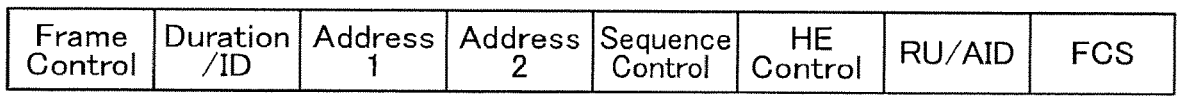
FIG. 11 is a diagram illustrating another exemplary format of the trigger frame.

In the first to fourth examples, in order to notify the fact that a group ID is set, the Individual/Group bit of Address 2 field is converted into 1. In this example, the Individual/Group bit remains to be 0. Specifically, the MAC address (BSSID) of the base station is set in the Address 2 field as in the normal cases. Instead, the fact that a group ID is set is notified to the terminal using another field. For example, presence or absence of the group ID is set using the reserved area of the frame control field. Alternatively, the QoS field illustrated in FIG. 5 is retained in the trigger frame, and the presence or absence of the group ID is set in the reserved area of the QoS field. Alternatively, a new field, for example, the HE (High Efficiency) control field illustrated in FIG. 11 is provided in the MAC header, and the presence or absence of the group ID is set in the HE control field. This example is the same as or similar to the first to fourth example apart from the notification of the presence or absence of the group ID.

Sixth Example

In the sixth example, the method of notifying the fact that a group ID is set in the Address 1 field of the trigger frame is different from those in the first to fifth examples. This example is explained below with the focus given to the difference in relation to the fifth example. In the fifth example, in order to notify the fact that a group ID is set, the new field is provided or the reserved area of the existing field is used. In contrast, in the sixth example, the AID field of the RU/AID field is used. In the AID field, the above-described "unused value that is not used as an AID" is set in the AID field. The unused values may be entered in all the AID fields or may be entered only in particular one or a plurality of AID fields, for example, in the first AID field. In the sixth example, the fact that the "unused value that is not used as an AID" s set in the AID field indicates the fact that a group ID is set in the Address 1 field. A "value that is not assigned as an AID" may be used in place of the "unused value that is not used as an AID."

When the terminal receives the trigger frame (when it recognizes that the received frame is a trigger frame by the Type and the Subtype of the frame control field), the terminal checks either one of the AID fields or the value or values of the particular one or a plurality of AID fields in the RU/AID field. When the value is an "unused value that is not used as AID" (or "a value that is not assigned as an AID"), then the terminal recognizes the fact that a group ID is set in the Address 1 field. Alternatively, when the values of all the AID fields in the RU/AID field are checked and all of them are the "unused values that are not used as an AID" (or "values that are not assigned as AIDs"), then the terminal may recognize the fact that a group ID is set in the Address 1 field. When the terminal has recognized the fact that a group ID is set in the Address 1 field, the terminal reads the value set in the Address 1 field and determines whether or not the terminal itself belongs to the group of the group ID indicated by the value. When the terminal itself belongs to the group, then the terminal identifies the resource unit indicated by the value set in each RU field of the RU/AID field as the resource unit that can be used by the terminal itself. The terminal randomly selects the resource unit to be used by the terminal itself from among the identified resource units as has been previously described. The subsequent operations are the same as or similar to the first example.

Seventh Example

Figure 12:
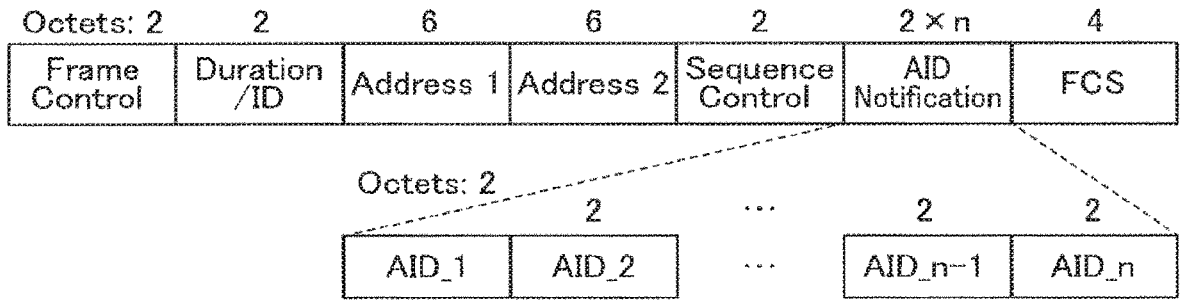
FIG. 12 is a diagram illustrating another exemplary format of the trigger frame.

The seventh example uses the format of the trigger frame illustrated in FIG. 12. The difference from the exemplary format illustrated in FIG. 9 lies in the fact that the RU/AID field is substituted by an AID Notification Field. The AID Notification field includes n AID fields (AID_1, AID_2 ... AID_n). Each AID field is associated with corresponding one of predetermined resource units. For example, the AID_1 is associated with the resource unit 1, the AID_2 is associated with the resource unit 2 and so forth. Correspondence of specific one of the AID fields to specific one of the resource units may be notified in advance from the base station to each terminal, or may be defined in advance by the system or the specification. The method of setting each AID field and other fields are the same or similar to those that have been described in the foregoing. Also, the operation of the terminal when it has received the trigger frame is also the same as or similar to that of the foregoing examples apart from the fact that the operation to check the RU field does not need to be done.

Eighth Example

Figure 13:
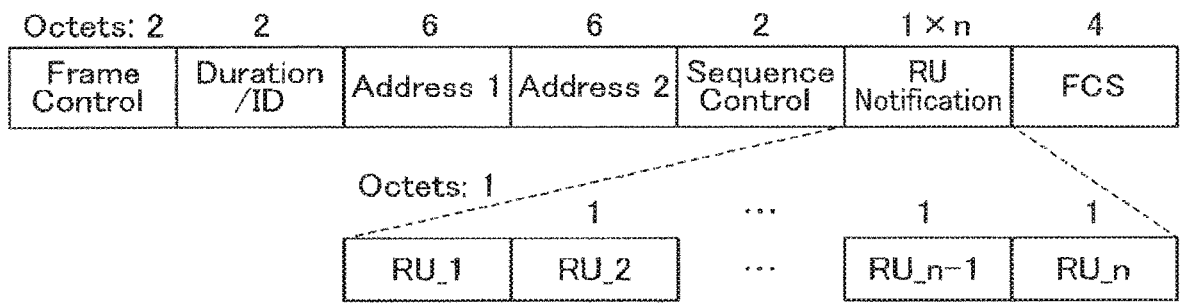
FIG. 13 is a diagram illustrating another exemplary format of the trigger frame.

The eighth example uses the format of the trigger frame illustrated in FIG. 13. Difference from the exemplary format illustrated in FIG. 9 lies in the fact that the RU/AID field is substituted by an RU Notification Field. The RU Notification Field includes n RU fields. As in the same or similar manner as in the first to the sixth examples, identifiers of the resource units that can be used in UL-OFDMA are set in each of the RU fields. The method of setting other fields are the same as or similar to those of the first example or fifth example.

For example, when the settings are made basically in accordance with the first example, a group ID is set in the Address 1 field and the MAC address of the base station with the Individual/Group bit of 0 substituted by 1 is set in the Address 2 field. Also, the Type of the frame control field is set as "Control" or "Management," and a value used for the Subtype is newly defined for the trigger frame. Alternatively, the Type may be set as "Data." In this case, it may be considered that a field notifying whether or not it is a trigger frame is separately provided in the MAC header in place of defining a new value for the Subtype, and the bit is set in this field, and thereby notification of the fact that it is the trigger frame is performed.

Also, when the settings are done basically in accordance with the fifth example, the group ID is set in the Address 1 field, and the MAC address (BSSID) of the base station is set in the Address 2. Also, presence or absence of the group ID is set in the reserved area of the frame control field or the reserved area in the QoS field (see FIG. 5). Alternatively, an HE (High Efficiency) control field, for example, illustrated in FIG. 11, is provided in the MAC header, and the presence or absence of the group ID is set in the HE control field. Setting of the frame control field is the same as or similar to those of the above first example, etc.

When the terminal receives the trigger frame (for example, recognizes that the received frame is a trigger frame by the Type and the Subtype of the frame control field), the terminal recognizes the available resource unit or units from each RU field in the RU Notification Field, and randomly selects the resource unit or units from among the recognized resource units. The subsequent operations is the same or similar to those of the first example, etc.

Ninth Example

Figure 14:
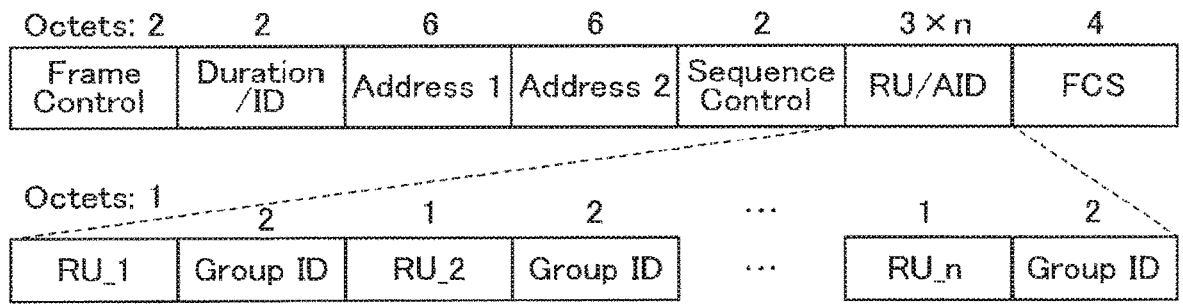
FIG. 14 is a diagram illustrating another exemplary format of the trigger frame.

In the ninth example, in the same or similar manner as in the first to sixth examples, the format of the trigger frame illustrated in FIG. 9 is used, but the ninth example differs from the first to sixth examples in its usage of the Address 1 field and the AID field. In this example, a broadcast address or a multicast address is set in the Address 1 field. The frame in which the broadcast address is set is a frame that any one of the terminals 1 to 8 receives as the frame addressed to the terminal itself. In the case of the multicast address set, it is assumed here that the terminals 1 to 8 are the target terminals of the multicast address and receive the frame as it is addressed them. However, it is also possible to use a multicast address of a group to which some of the terminals 1 to 8 do not belong. A group ID is set in each AID field in the RU/AID field. The MAC address of the base station whose Individual/Group bit 0 is substituted by 1 is set in the Address 2 field in order to notify the fact that a group ID is set in each AID field. In the above-described other example, in order to notify the fact that a group ID is set in the Address 1 field, the Individual/Group bit set to 0 is converted into 1. In this example, however, in order to notify the fact that a group ID is set in the AID field, the Individual/Group bit is converted into 1. The group ID of the UL-OFDMA-eligible group is set in each AID field as the common value. FIG. 14 illustrates a state where the group ID is set in each AID field. The length of the group ID is defined as two octets in the example of FIG. 14 in view of the original purpose of the AID field in which the AID is set, but the AID field length may be modified if one octet is sufficient for representation of the group ID (for example, a case where the group ID consists of six bits) such as configuring it as one-octet field. In this case, information that distinguishes the format from the format of FIG. 10 may be set in the beginning of the RU/AID field, in the reserved area of an existing field as described above, or in a newly added field or the like.

When the terminal receives the trigger frame, the terminal determines that the frame is the one that should be received by the terminal itself by the address of the Address 1 field of the received frame, and recognizes that the received frame is a trigger frame by the Type and the Subtype of the frame control field. Since the Individual/Group bit of the Address 2 field is 1, the fact that a group ID is set in the AID field is recognized. The terminal read the group ID from at least one AID field and determines whether or not the group ID indicates the group of the terminal itself. If it does not indicate the group of the terminal itself, the terminal determines that the terminal itself is not UL-OFDMA-eligible at this time and discards this frame. Meanwhile, if the above group ID indicates the group ID of the terminal itself, then the terminal reads the identifier of the resource unit from each RU field and recognizes the available resource unit. And the terminal randomly selects the resource set from among the recognized available resource units.

The subsequent operations are the same as or similar to those of the first example, etc.

Tenth Example

The difference from the ninth example is explained below. In the above-described ninth example, a common group ID is set in each of the AID fields, but in the tenth example, it is allowed to set different group IDs for each of the AID fields. The base station decides on the available groups for each resource unit, and sets the group ID of the relevant Group in the AID field corresponding to the RU field.

When the terminal has received the trigger frame, the terminal detects the group ID set in each AID field and determines whether or not the terminal itself belongs to this group ID. The terminal recognizes only the resource units designated by the RU field corresponding to the AID field in which the group ID to which the terminal itself belongs is set, as the resource unit or units that can be used by the terminal itself. And the terminal randomly selects the resource unit from among the recognized available resource units. The subsequent operations are the same as or similar to those of the first example, etc.

Eleventh Example

In the above-described ninth and tenth examples, the MAC address of the base station whose Individual/Group bit 0 is substituted by 1 is set in the Address 2 field in order to notify the fact that a group ID is set in each AID field. In contrast, in the eleventh example, the fact that a group ID is set in each AID field is notified by a different method.

In the eleventh example, information notifying the fact that a group ID is set in each AID field (group ON information) is set in reserved area of an existing field such as the reserved area of the frame control field, a newly defined field such as the HE control field illustrated in FIG. 11, or the like. Alternatively, if an unused area (reserved area) exists in the RU field (for example, the area of the last two bits when all the resource units can be discriminated by the higher six bits), the group ON information may be set in this area. When the group ON information is not set, the base station sets the AID in each AID field (in this case, as described above, UL-OFDMA is carried out with the terminals designated on a per-resource-unit basis). In this case, the base station sets information (group OFF information) notifying the fact that the AID is set in the above area or in the new field or the like in place of the group ON information. The MAC address (BSSID) of the base station is set in the Address 2 field as in the normal cases. A broadcast address or a multicast address is set in the Address 1 field in the same or similar manner as in the ninth example and the tenth example.

The terminal that has received the trigger frame determines whether or not the group ON information is set in the above-described existing reserve field or a newly defined field. When the group ON information is set, then the terminal recognizes the fact that a group ID (not an AID) is set in the AID field. The subsequent operations are the same or similar to those of the ninth or tenth example.

Twelfth Example

The twelfth example uses yet another method different from those of the ninth to the eleventh examples to notify the fact that a group ID is set in each AID field. It is considered here that in the twelfth example, a broadcast address or a multicast address is set in the Address 1 field in the same or similar manner as in the ninth example and the tenth example, and the MAC address (BSSID) of the base station is set in the Address 2 field as in the normal cases.

In the twelfth example, the setting of the predetermined area in each AID field is modified based on whether the group ID is set or the AID is set. For example, the when base station can describe the AID using fourteen bits of the two octets (16 bits), then the fourteen bits of the zeroth to thirteenth bits are used to set the value of the AID or the group ID (which is assumed to have a shorter bit length than that of the AID), and the two bits of the fourteenth and fifteenth bits are used to identify whether the group ID is set or the AID is set. For example when the AID is to be set, these two bits are set to "11" (group OFF information). When the group ID is to be set, these two bits are set to "00." The bit setting described herein is an example and other bit settings may also be considered.

When the terminal has received the trigger frame, the terminal checks the predetermined area in each AID field (the fourteenth and fifteenth bit in this example). When the group ON information (for example, "00") is set, the terminal recognizes the fact that a group ID is set in the AID field. When the group OFF information (for example, "11") is set, the terminal recognizes the fact that the AID is set in the AID field. The operation after recognizing the fact that a group ID is set is the same as or similar to those of the ninth example or the tenth example.

Thirteenth Example

In the first to twelfth examples, two modes of usage exist, i.e., a case where the group ID is set and another case where it is not set. In addition, when the group ID is set, Individual/Group bit of the Address 2 field is set to 1, the information indicating the fact that a group ID is set (group ON information) is set in the reserved area of an existing field, the newly defined field, or a predetermined area of the AID field. In contrast, in the thirteenth example, a Group ID field is defined by default in the frame format. FIG. 15 illustrates the frame exemplary format of this case. The Group ID field is added between the Sequence Control field and the RU/AID field. The length of the Group ID field is given as one octet but not limited to this. The RU/AID field that, for example, has the same configuration as that illustrated in FIG. 10 may be used. A predetermined value may be set in the AID field in the same or similar manner as in the first example (in a case where the terminal does not need to read the AID field).

Alternatively, when a particular resource unit is to be designated for a particular terminal among the terminals that belongs to the group designated by the Group ID field, the AID of the particular terminal may be set in the AID field that corresponds to the RU field designating the particular resource unit. In addition, an unused value that is not used as an AID, or a value that is not assigned as an AID may be set in an AID field that corresponds to the RU field designating a resource unit which any terminal is allowed to use as long as it belongs to the group.

The AID set in each AID field may be a partial AID (which also applies to the above-described other examples). The partial AID is part of the AID and it is assumed that overlapping of the partial AIDs does not occur at least among the terminals belonging to the same group. The partial AID may be the one that is defined in the IEEE 802.11 standard. By using the partial AID in place of the AID, it is made possible to reduce the length of the AID field. For example, the length of the AID field can be modified from two octets to one octet. In this case, the size of the RU/AID field can also be modified from 3×n to 2×n.

It is considered here that a broadcast or multicast address should be set in the Address 1 field and the MAC address (BSSID) of the base station should be set in the Address 2 field as in the normal cases. Also, the setting of the frame control field should be made in the same or similar manner as in the first to twelfth examples.

When the terminal has received the trigger frame, the terminal determines whether or not the terminal itself belongs to the group designated in the Group ID field. When it belongs to the group, the terminal recognizes the available resource units from the value set in each RU field set in the RU/AID field.

In addition, the terminal randomly selects the resource unit from among the recognized resource units based on the aforementioned behavior. The subsequent operations are the same as or similar to those of the other exemplary operations. It is considered here that when the terminal determines that the terminal itself does not belong to the group designated in the Group ID field, the terminal may make transition to a sleep mode (power saving mode) for a predetermined period of time, such as the period designated by the Duration/ID field. The operation to make transition to the sleep mode is also applicable to the first to thirteenth examples.

Alternatively, when the terminal itself belongs to the group designated by the Group ID field, the terminal examines the AID (or partial AID) set in the AID field and determines whether or not the terminal itself is designated. When the terminal itself is designated, the terminal determines that the terminal itself uses the resource unit set in the corresponding RU field. It is considered here that the number of resource units designated for the terminal itself is less than H (an integer equal to or larger than 1), the number of resource units required for transmission, the terminal identifies the RU field that corresponds to the AID field in which the unused value that is not used as an AID or the value that is not assigned as an AID, and recognizes that the resource unit designated by the RU field as an available resource unit. In addition, resource units in the number corresponding to the value H subtracted by the actual number of the resource units may be randomly additionally selected from among the recognized available resource units.

Fourteenth Example

The fourteenth example uses the format of the trigger frame illustrated in FIG. 16. It differs from that of FIG. 15 in that the RU/AID field is substituted by an RU Notification Field. The configuration of the RU Notification Field is the same as or similar to that of FIG. 13, and has a form in which the AID field is omitted from the RU/AID field. By using this format, the same or similar operation as that of the thirteenth example where the AID field is ignored can be achieved with shorter trigger frame length.

Fifteenth Example

The fifteenth example uses the format of the trigger frame illustrated in FIG. 17. It differs from that of FIG. 16 in that the RU Notification Field does not exist in it. It is assumed here that, when this format is used, the resource units that can be used in UL-OFDMA are defined in advance and they are notified in advance from the base station to the terminal, or they are defined in advance by the system or the specification. By virtue of this, the scheme for making each terminal randomly designate the resource unit to perform UL-OFDMA can be achieved with trigger frames with shorter frame lengths.

Sixteenth Example

In the foregoing explanations, terminals that have already been connected to the base station and have their AIDs assigned are treated as being UL-OFDMA-eligible. However, it is also possible to designate any terminal that is not connected to the base station and has not an AID assigned as being UL-OFDMA-eligible. In this case, a certain group ID is defined for the terminal for which the AID is not designated. Accordingly, a terminal that has already been connected to the base station does not belong to this group ID. The base station generates and transmits a trigger frame in which this group ID is set on the basis of any one of the above-described first to fifteenth examples. A terminal that received the trigger frame and does not have an AID assigned thereto (terminal that is yet to be connected to the base station) determines that the terminal itself belongs to this group ID. The terminal may be notified in advance about the notification of this group ID from the base station by a beacon frame or the like, or this group ID may be defined by the system or the specification. The relevant terminal randomly selects the resource unit as has been previously described. The sizes of the resource units that can be used at this point may be defined to be equal to each other. The terminal can carry out uplink transmission of the association request frame by the selected resource unit (in this case, the base station receives association request frames simultaneously from a plurality of terminals). The association request frame is an example and other frames may be used such as a reassociation request frame, a probe request frame, and the like.

Also, in order to achieve the same or similar operation, instead of using a group ID for the terminal for which the AID is not designated, an unused value that is not used as an AID may be set in the AID field in any one of the above-described formats. In this case, the unused value that is not used as an AID means, in contrast to the above-described first to fifteenth examples, that a terminal for which the AID is not designated (terminal that has not yet been connected to the base station) is designated. The terminal for which the AID is not designated recognizes in advance the range of the AID (for example, 1 to 2007) by the system or the specification, and determines that values out of this range are values that are not used as the AIDs. When having received the trigger frame, the terminal to which an AID is not assigned (terminal that has not yet been connected to the base station) determines that the terminal itself is designated if an unused value that is not used as an AID is set in any one of the AID fields. And the terminal randomly selects the resource unit and is allowed to carry out uplink transmission of frames such as the association request frame using the selected resource unit.

It is considered here that an UL-OFDMA can also be implemented that involves both the terminal for which the AID is not designated and the terminal for which the AID is designated as described in the first to fifteenth examples. In this case, it can be readily implemented by combining the sixteenth example with any one or a plurality of the first to fifteenth examples.

Seventeenth Example

The group ID may be provided for terminals carrying out power saving and it may be designated by the trigger frame. For example, suppose here that in some cases a terminal carrying out power saving periodically sends a particular frame to the base station. For example, this may imply that the terminal is requested to periodically send PS-Poll. In view of this, in accordance with the timing, the base station may be adapted to transmit a trigger frame that designates the group ID of terminals carrying out power saving and receive a particular frame from a plurality of terminals. The individual terminals does not need to carry out processes such as acquisition of the access right by carrier sense and back-off in contrast to a case of a conventional single user transmission, which makes it possible to achieve further reduction in the power consumption.

Eighteenth Example

The above-described frame formats illustrated in FIGS. 9 to 17 are exemplary formats and other fields may exist in the trigger frame. For example, there may be provided a field for setting information designating the packet length (PPDU length) of the physical packet transmitted by UL-OFDMA. An MCS (modulation coding method) used in UL-OFDMA or information designating the data rate may be set as well. The packet length, the MCS, or both of them may be the same for all the terminals belonging to the group designated by the group ID or may be individually designated for each of the terminals belonging to this group. Alternatively, designation of the MCS may be performed on a per-resource-unit basis. The field in which the above-described information is set may be located at any position within the trigger frame. For example, it may exist in the HE Control field as illustrated in FIG. 11, in the frame body field, or in the RU/AID field. The examples described herein are examples and other fields for setting various pieces of information may be provided.

Combinations of First to Eighteenth Examples

The above-described first to eighteenth examples can be independently implemented and two or more of these examples may be combined as appropriate as long as inconsistency does not occur in their operations. For example, by combining the thirteenth example and the fourth example, an AID of the terminal for which use of the resource block is prohibited may be set in the AID field in the thirteenth example. Combinations other than this are also possible.

Figure 18:
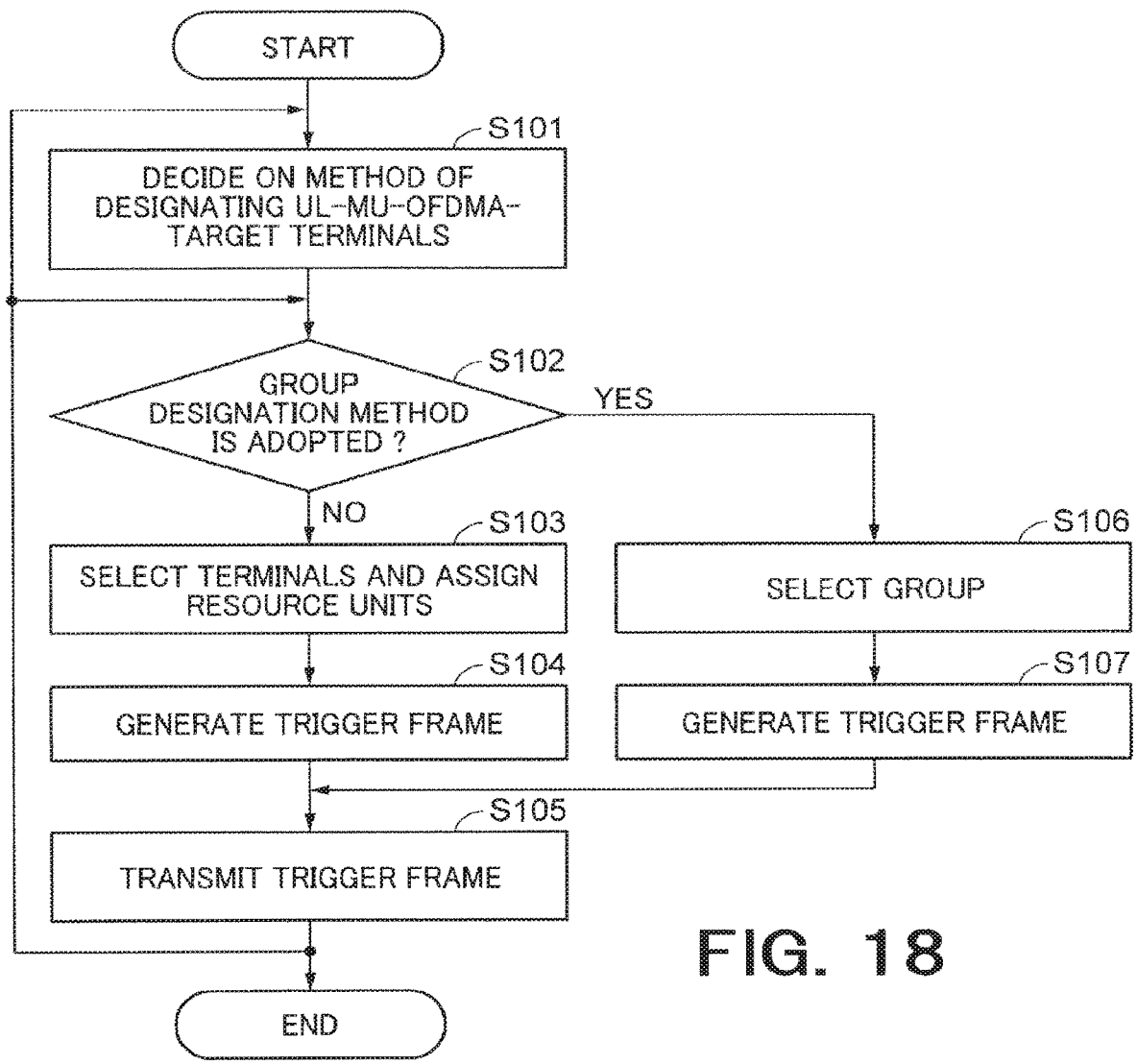
FIG. 18 is a diagram illustrating a flowchart of an example of operation of the base station in accordance with the embodiment of the present invention.

FIG. 18 illustrates a flowchart of one example of the operation of the base station in accordance with the embodiment of the present invention. When the base station has decided to start UL-OFDMA at a predetermined timing, the base station determines, as the method of designating the UL-OFDMA-eligible terminals, whether it uses the individual designation method that individually designates the individual terminals or the group designation method that designates the group (S101). It is considered here that the determination of the method may be performed prior to start of UL-OFDMA or either one of them may be determined in advance.

When the individual designation method has been decided (NO in the step S102), the individual terminals for which UL-OFDMA is carried out this time are selected from among the OFDMA-compliant terminals that are currently connected to the base station and the resource units assigned to each of the terminals are decided (S103). Any methods may be used as the method of selecting the individual terminals. For example, presence or absence of an UL-OFDMA request from each terminal may be collected and the terminals may be selected from the terminals having the requests. Alternatively, on the basis of the data amount for transmission by each terminal, terminals having the largest data amount may be preferentially selected, or terminals having the same or similar data amounts may be selected. Also, the terminals may be selected from among the terminals belonging to the same group. At this point, as the criteria for selecting the group, items may be taken into account such as presence or absence of the UL-OFDMA transmission request from each terminal belonging to each group and the transmission data amount. Alternatively, the terminals or groups may be selected by round-robin, or terminals or groups may be randomly selected. Alternatively, it is also possible to select a terminal having a data whose subsequent data to be transmitted is estimated to have the same or similar size or select terminals whose periods of generation of data are the same as or similar to each other (terminals whose data generation periods fall within a predetermined range of values, or a predetermined number of terminals whose data generation periods are the closest to each other, etc.). Alternatively, the spatial channel characteristics with each terminal may be recognized in advance, and on the basis of the spatial channel characteristics, combination of terminals having a small spatial correlation (exhibiting less interference) may be selected. It is considered here that the number of terminals to be selected is up to the maximum number of available resource units. Meanwhile, when the above-described OFDMA&MIMO scheme is used, it is possible to select terminals in the number that is larger than the maximum resource unit number. When a lower limit is set for the number of terminals to be selected, terminals in the number equal to or larger than the lower limit may be selected. The examples of the section of the terminals are merely examples and methods other than those described herein may be used to select the terminals.

Also, the method of assigning the resource units may be performed as appropriate. For example, when the resource units are all on the same bandwidth and one resource unit is assigned to each terminal, any one of the resource units may be assigned to each terminal. Also, when there exist resource units of different bandwidths, a resource unit of larger bandwidth may be assigned to a terminal of larger data amount. Also, when more than one resource unit is assigned to one terminal, resource units consecutively arranged on the frequency domain may be selected, and it is also possible to select non-continuously arranged resource units.

It is considered here that the band used in UL-OFDMA uplink transmission may be defined in advance by the system or the specification, or may be determined by the base station when performing UL-OFDMA. Alternatively, it may be determined by any methods other than those mentioned herein.

The base station sets, in the predetermined fields of the trigger frame, the identifier of the selected terminal (AID, etc.) and the identifier of the resource unit assigned to this terminal (S104). The predetermined fields depend on the formats in use. In the format of FIG. 10, the predetermined fields are the RU field and the AID field in the RU/AID field. A broadcast address or a multicast address is set in the Address 1 field as the RA. Also, the MAC address (BSSID) of the station itself is set in the Address 2 field. Also, values for the trigger frame may be set in the Type field and the Subtype field of the frame control field. It is considered here that the identifier of the resource unit may be unique values for bands such as 20 MHz, 40 MHz, 80 MHz, etc. or it may be allowed to use an identifier having the same value for different bands. When it is allowed to use the identifier having the same value for different bands, information discriminating a used band or bands from the other bands should be notified in the trigger frame (for example, HE Control field of FIG. 11, etc.) in addition to the identifier of the resource unit or the band to be used may be notified in advance to the terminal.

The base station, when having generated the trigger frame, acquires the access right to access the wireless medium in accordance with CSMA/CA, and transmits the trigger frame (more specifically, a physical packet including the trigger frame) on the basis of the acquired access right (S105). The trigger frame is, for example, transmitted by the channel of the basic channel width (for example, 20 MHz) with which a legacy terminal can also perform transmission and reception.

Figure 19:
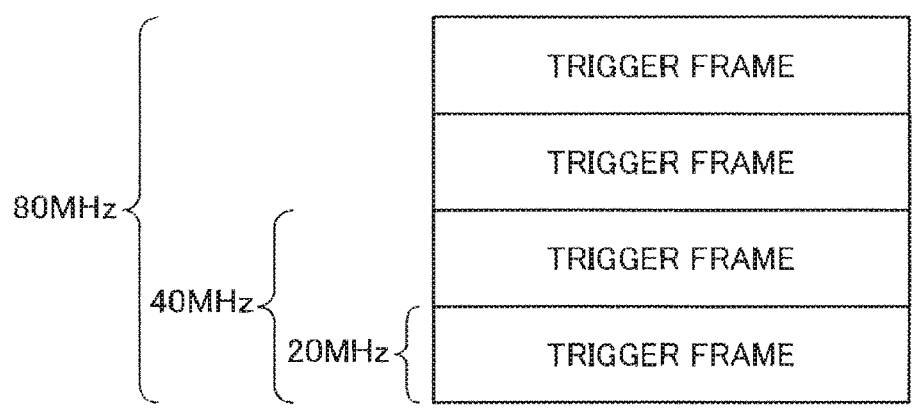
FIG. 19 is a diagram for explanation of a channel for transmission of the trigger frame.

Here, the band used in the UL-OFDMA uplink transmission is a band on which the trigger frame was transmitted. If the band for the uplink transmission is 20 MHz, this is the same band as that on which the trigger frame was transmitted. When the band of the uplink transmission is 40 MHz, the transmission of the trigger frame may be respectively done on two channels each having a 20 MHz width within the 40 MHz width. Also, when the band of the uplink transmission is 80 MHz, the transmission of the trigger frame may be respectively done on four channels each having a 20 MHz width within the 80 MHz width. These modes are illustrated in FIG. 19. The contents of the trigger frames can be the same. After the step S105, the process may go back to the step S101 or S102.

Meanwhile, the base station, when having decided on the group designation method, selects the group that is allowed for the UL-OFDMA of this time from among one or more groups generated by sorting the currently connected OFDMA-compliant terminals (S106). Any methods may be used as the method of selecting the group. For example, presence or absence of an UL-OFDMA request from each terminal may be collected and the group may be selected that includes the terminals having the requests. Alternatively, on the basis of the data amount for transmission by each terminal, a group including terminals having the largest data amount may be selected, or the group that includes the largest number of terminals having the same or similar data amounts may be selected. Alternatively, the group may be selected by round-robin, or the group may be randomly selected. Alternatively, it is also possible to select the group that includes the largest number of the terminal having a data whose subsequent data to be transmitted is estimated to have the same or similar size or select terminals whose periods of generation of data are the same as or similar to each other (terminals whose data generation periods fall within a predetermined range of values, or a predetermined number of terminals whose data generation periods are the closest to each other, etc.). It is considered here that one single group is selected, but as described above, it is also possible to select a plurality of groups. The examples of the selection of the group described herein are merely examples and methods other than those described herein may be used to select the group.

It is considered here that the band used in UL-OFDMA uplink transmission may be defined in advance by the system or the specification, or may be determined by the base station when performing UL-OFDMA. Alternatively, it may be determined by any methods other than those mentioned herein.

The base station sets the group ID of the selected group in the predetermined field of the trigger frame (S107). The predetermined field depends on the formats to be used and their mode of usage and, for example, is the RA field (Address 1 field) in the case of the format of FIG. 10. Also, the MAC address (BSSID) of the station itself with the Individual/Group bit inverted from 0 to 1 is set in the Address 2 field. Also, values for the trigger frame may be set in the Type field and the Subtype field of the frame control field. They may be set by methods other than those described herein, and formats other than the format of FIG. 10 may be used. Since the details have already been explained, further explanations are omitted. Also, the base station may set information discriminating a used band or bands in the trigger frame (for example, in the HE Control field of FIG. 11, etc.) or notify it in advance by another frame, or the band to be used may be defined in advance by the system or the specification. Alternatively, notification of the band or bands to be used may be implicitly notified in accordance with the channels (bands) on which the trigger frames are received. For example, when the channel of the basic channel width of 20 MHz is used in the uplink transmission, as illustrated in FIG. 19 mentioned above, the trigger frame is transmitted on this channel. When the channel of 40 MHz width is used, the transmission of the trigger frame may be respectively done on two channels each having a 20 MHz width included in the 40 MHz width. Also, when the channel of 80 MHz width is used, the transmission of the trigger frame is respectively done on four channels each having a 20 MHz width within the 80 MHz width. The terminal on the reception side determines that the uplink transmission is possible on the channel (band) on which the trigger frame was received. It is considered here that when reception of the trigger frame was successful in some of the channels on the side of the terminals but failed in other channels, the resource units to be selected may be restricted such that only the resource units included in the reception-successful channels (bands) are selected.

When the base station has generated the trigger frame, the base station acquires the access right to the wireless medium in accordance with CSMA/CA and transmits a trigger frame (more specifically, a physical packet including the trigger frame) on the basis of the acquired access right (S105). The details of the step S105 are as described above. After the step S105, the process may go back to the step S101 or S102.

In the explanation of the group designation method of FIG. 18, selection of the terminal and assignment of the resource unit may be performed in addition to the selection of the group. In this case, the group ID is set in the trigger frame, and the pair of the identifier (AID, etc.) of the selected terminal and the identifier of the resource unit is set in the trigger frame, by virtue of which the resource unit may be designated for the selected terminal. It is considered here that the terminal to be selected may be a terminal that belongs to the selected group, or may be selected from another group other than the selected group. Also, it may be considered that the terminal for which implementation of UL-OFDMA is prohibited is selected within the group and the identifier of the selected terminal is set in the trigger frame so as to ensure that the selected terminal cannot perform the selection of the resource unit and the uplink transmission. The operations described herein are only examples and various modified operations are possible to realize the above-described first to seventeenth examples and the combinations thereof.

Figure 20:
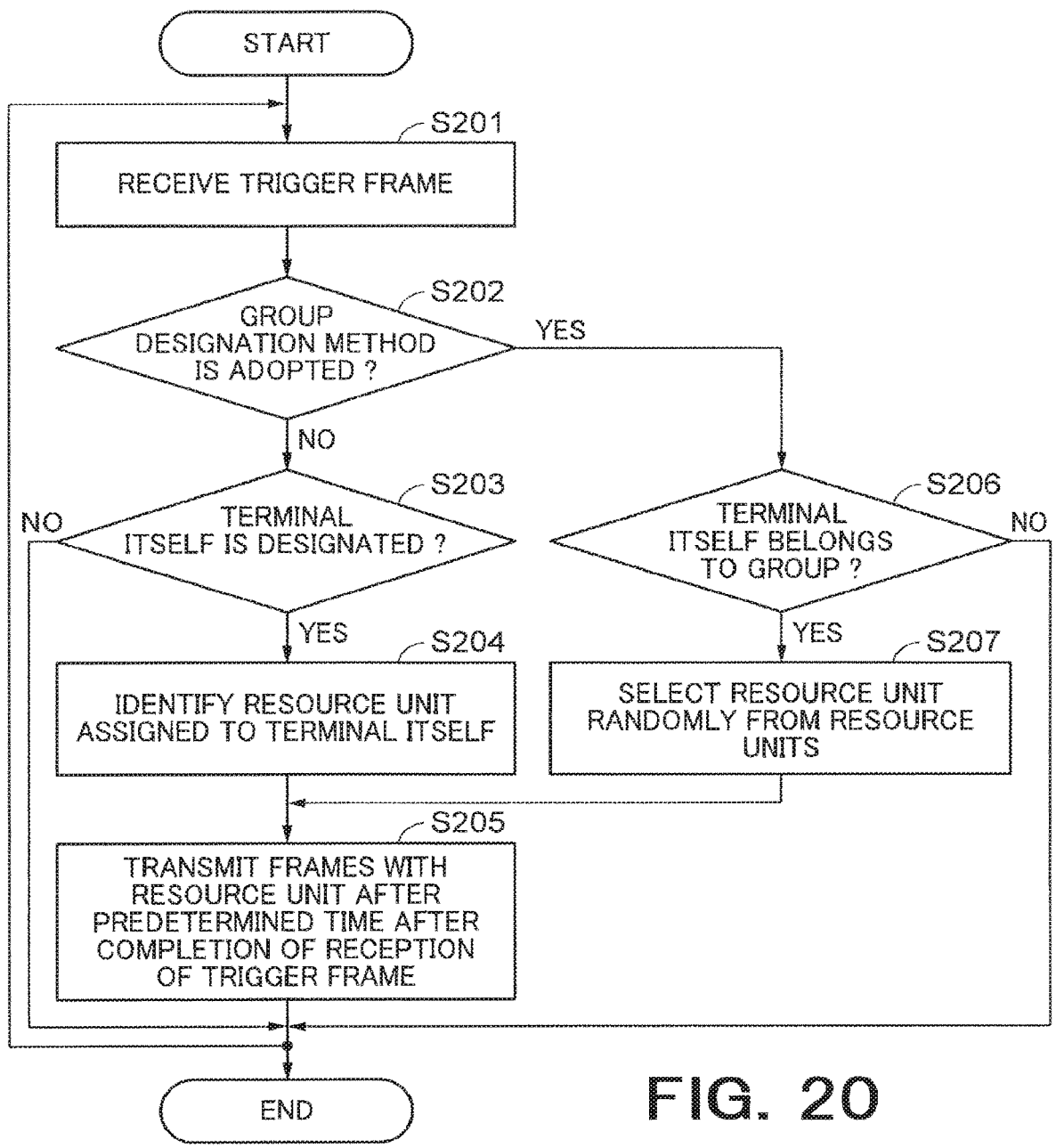
FIG. 20 is a diagram illustrating a flowchart of an example of operation of a terminal in accordance with the embodiment of the present invention.

FIG. 20 illustrates a flowchart of an example of the operation of the terminal in accordance with the embodiment of the present invention. When the terminal has received the trigger frame transmitted from the base station (S201), the terminal determines, on the basis of the information set in the trigger frame, whether the individual designation method individually designating individual terminals is designated or the group designation method designating a group is specified (S202). The method of determination varies depending on the formats of the trigger frame and their mode of usage. For example, when the Individual/Group bit in the Address 2 field is set to 1, it is determined that the designation method is the group designation method, and if it is set to 0, then it is determined that the designation method is the individual designation method. Alternatively, the determination is made on the basis of the predetermined field in which the information is set for identifying either the group designation method or the individual designation method. Another configuration is also possible for the determination to be made in accordance with methods other than those described herein. The details are as described in the foregoing.

When the individual designation method is designated (NO in the step S202), it is determined whether or not the terminal itself is designated as the UL-OFDMA-eligible terminal (S203). For example, when the AID of the terminal itself is set in the AID field, it is determined that the terminal itself is designated. When the terminal itself is designated, the resource unit assigned to the terminal itself is identified (S204). For example, the resource unit designated in the RU field corresponding to the AID field in which the AID of the terminal itself is set is identified as the resource unit assigned to the terminal itself. The terminal generates frames such as data frame for uplink transmission and the like and performs the transmission with the identified resource unit after the elapse of a predetermined time period after the completion of the reception of the trigger frame (S205). When conditions such as the transmission packet length (PPDU length), MCS, etc. are designated in the trigger frame, generation and transmission of the frames are performed such that these conditions are satisfied.

Meanwhile, when the group designation method is designated (YES in the step S202), the group ID is read from the predetermined field of the trigger frame and it is determined whether or not the terminal itself belongs to the group indicated by the group ID (S206). The predetermined field in which the group ID is set varies depending on the formats of the trigger frame and their mode of usage. For example, the group ID is set in the RA field (Address 1 field). Alternatively, a configuration in which the group ID is set in the AID field and another configuration in which the group ID is set in the HE Control field of FIG. 11 are also possible. Details are as described in the foregoing. When the terminal itself belongs to the above group, the terminal randomly selects the resource unit from among a plurality of resource units that becomes the candidates (S207). Between the steps S206 and S207, a step may be added for determining whether the terminal has a right to select the resource unit. For example, a value of the backoff counter which was randomly selected in advance is subtracted by the number of the resource units that becomes the candidates, and when the resultant value is zero or less, the terminal acquires the right to select the resource unit and the processing proceeds to the step S207. When the resultant value is more than zero, the terminal cannot acquire the right to select the resource unit and the processing ends or returns to the step S201. The resource units that become the candidates are designated by the RU field or the like of the trigger frame. Also, when a plurality of group IDs are set in the trigger frame and different resource units that become the candidates are designated for each of the group ID, then the terminal identifies the resource unit that becomes the candidate associated with the group ID to which the terminal itself belongs. Alternatively, the resource units that become the candidates may be defined in advance by the system or the specification or the like. Alternatively, when identification information identifying a set of the resource units that become the candidates is set in the trigger frame, then the resource units that become the candidate may be identified from the identification information that is set and the correspondence information associating the identification information with the resource units (a table, etc.). The correspondence information may be notified in advance by the base station. The number of resource units to be randomly selected may be defined in advance, or information designating the number of the units to be selected may be set in the trigger frame. The terminal generates a frame such as a data frame for uplink transmission and transmits it in the randomly selected resource unit after the elapse of a predetermined time period after the completion of the reception of the trigger frame (S205). When conditions such as the transmission packet length (PPDU length), MCS, etc. are designated in the trigger frame, generation and transmission of the frames are performed such that these conditions are satisfied.

It is considered here that, when it has been determined that the group ID is designated in the step S202, a configuration is also possible according to which whether or not individual designation of the resource unit is made for the terminal itself is checked in addition to the determination regarding whether or not the terminal itself belongs to the above group. In this case, the terminal uses the designated resource unit even when it belongs to the above group. In other words, the other terminals, when there is any resource unit that is designated for the terminal, randomly select from among the resource units that become candidates other than the resource unit. Also, when the terminal itself which belongs to the group is designated as the UL-OFDMA-prohibited terminal, the terminal itself is adapted to not perform the selection of the resource unit and the uplink transmission. When the prohibited terminals are designated for each resource unit, random selection is to be made from among the resource units other than the designated resource unit in the random selection of the resource unit. Details thereof are as described in the foregoing. The operations described herein are merely examples and various modified operations are possible to realize the above-described first to seventeenth examples and the combinations thereof.

According to this embodiment, efficient communications are carried out by designating resource units for each terminal for example in a case where presence or absence of the uplink requests can be accurately grasped, and otherwise the terminals are designated by the group ID so as to suppress the number of terminals that become the transmission candidates appropriately, and to reduce the likelihood of a plurality of terminals simultaneously using the same resource unit. By virtue of this, it is made possible to suppress deterioration in efficiency of utilizing the resource. Also, when UL-OFDMA is carried out in a case where existence of terminals in power saving and presence of uplink transmission requests are not sufficiently grasped, increase in efficiency of utilizing the resource can be expected by designation of the group ID compared with the case of designation of individual terminals. In particular, this effect is expected to be large when the number of terminals belonging to the group is larger than the number of terminals to be designated in the case of the individual designation. Meanwhile, when the number of the terminals is too large, probability of collision between terminals within the resource units will increase. Accordingly, the relationship between the number of terminals belonging to the group and the number of resource units may be adjusted such that the number of the resource units becomes sufficiently large relative to the number of terminals belonging to the group. As one example, the number of resource units is adjusted such that the number of resource units becomes sufficiently large relative to the number of terminals belonging to the same group ID. The number of the resource units should be at least larger than the number of terminals belonging to the group ID. For example, the number of resource units may be defined as $2^{\wedge}$(the number of terminals belonging to the group ID)$-1$ or larger than that (for example, a case is considered where the terminal selects one resource unit). If the number of terminals belonging to the group ID is 4, then the number of resource units is set to be equal to or larger than 15 ($=2^{\wedge}4-1$). As has been previously described, other techniques such as to limit the number of terminals belonging to the same group to access the resource units may be used in combination. Also, in this embodiment, the same frame format (FIG. 10, etc.) can be diverted for the individual designation method and the group designation method.

It is considered here that this embodiment presents use of the trigger frame having the same format in different modes (for example, a mode according to which the resource units are individually designated for each terminal and another mode according to which the group ID is designated and the resource units used by the terminals are randomly selected on the side of the terminals), but there is no problem when the frame format of the trigger frame is adapted for either one of these two modes.

The difference between the configuration where transmission is performed using the resource units randomly selected by the terminals designated by the group ID in this embodiment and the Restricted Access Window (RAW) operation defined in the IEEE 802.11ah standard is explained. In the RAW operation, when one time slot is defined as a resource unit, a terminal is designated and assigned to the time slot or a group identifier is assigned thereto. Each terminal attempts to make an access from the time slot boundary (even when the terminal is designated) in accordance with CSMA/CA-based EDCA (Enhanced Distributed Channel Access). Meanwhile, this embodiment provides a plurality of resource units on the frequency domain, and terminals are designated for each of them, or the group indicated by the group identifier (a plurality of terminals) is collectively assigned to these resource units. And each terminal randomly selects one resource unit from a plurality of resource units in the frequency domain and transmits the frames after the elapse of a predetermined time after the completion of the reception of the trigger frame. Accordingly, in the RAW operation of the IEEE 802.11ah standard, CSMA/CA-based EDCA is carried out and thereby collision avoidance function works on each terminal. In contrast, in this embodiment, this function does not work. Accordingly, in this embodiment, in order to avoid occurrence of collision, it becomes more important to adjust the number of resource units on the frequency domain relative to the number of terminals expected to perform transmission as described above.

The above-stated group ID is merely one example, and may be other configuration. For example, the group ID may be a multicast address. In the above embodiment, the group identified by the group ID is a group of terminals which have been associated with the base station. Also, the AID may be used as the group ID. In that case, a value used as the group ID may be an unused value not assigned to associated terminals as the AIDs (i.e., a value less than 1 or larger than 2007). For example, AID 0 may identify terminals) which have not yet been associated with the base station.

Second Embodiment

Figure 21:
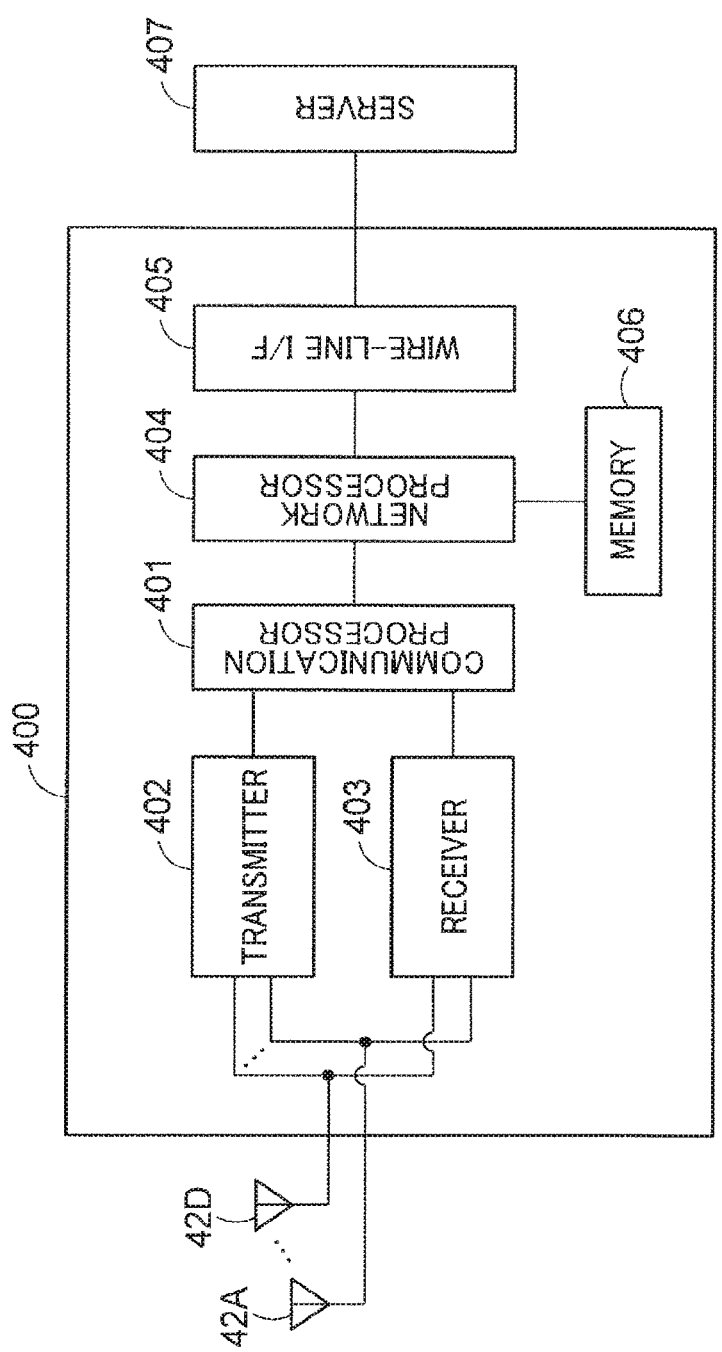
FIG. 21 is a functional block diagram of a base station or a terminal in accordance with a second embodiment.

FIG. 21 is a functional block diagram of a base station (access point) 400 according to a second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the MAC processor 10 and the MAC/PHY manager 60 described in the first embodiment. The transmitter 402 and the receiver 403 have functions similar to the PHY processor 50 and the analog processor 70 described in the first embodiment. The network processor 404 has functions similar to the higher processor 90 described in the first embodiment. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication apparatus that returns a response including requested data in response to reception of a data forward request for requesting transmission of the data. Examples of the server 407 include an HTTP server (Web server) and an FTP server. However, the server 407 is not limited to these as long as, the server 407 has a function of returning the requested data. The server 407 may be a communication apparatus operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) of the present embodiment can be applied as the base station of the first embodiment.

In the present embodiment, although the base station with the cache function is described, a terminal (STA) with the cache function can also be realized by the same block configuration as FIG. 21. In this case, the wired I/F 405 may be omitted.

Third Embodiment

Figure 22:
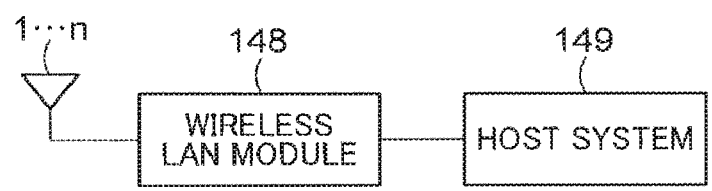
FIG. 22 is a diagram illustrating an exemplary overall configuration of a terminal or a base station in accordance with a third embodiment.

FIG. 22 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

Figure 23:
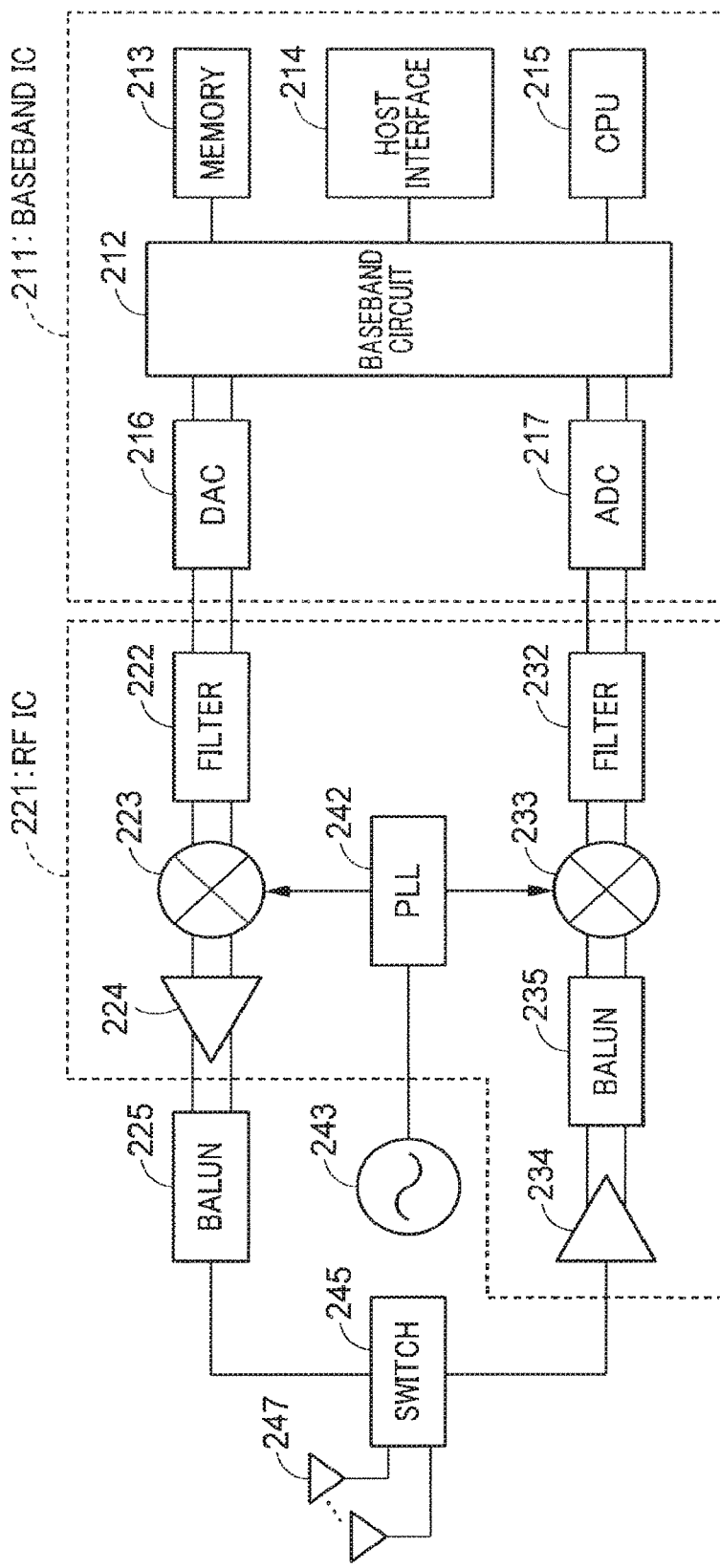
FIG. 23 is a diagram illustrating a hardware configuration of a wireless LAN module incorporated in a terminal or a base station in accordance with the third embodiment.

FIG. 23 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication apparatus shown in FIG. 1. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 and the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The baseband circuit 212 or the CPU 215 may execute a process regarding the MIMO. The baseband circuit 212 or the CPU 215 may execute at least one or a plurality of a process of propagation path estimation, a transmission weight calculation process, a separation process of stream, and the like. The baseband circuit 212 or the CPU 215 may control the operation of the filters 222 and 232 to extract signals covered by a used channel according to the setting of the channel. Another controller that controls the filters 222 and 232 may exist, and the baseband circuit 212 or the CPU 215 may issue an instruction to the controller to perform similar control.

Fourth Embodiment

Figure 24:
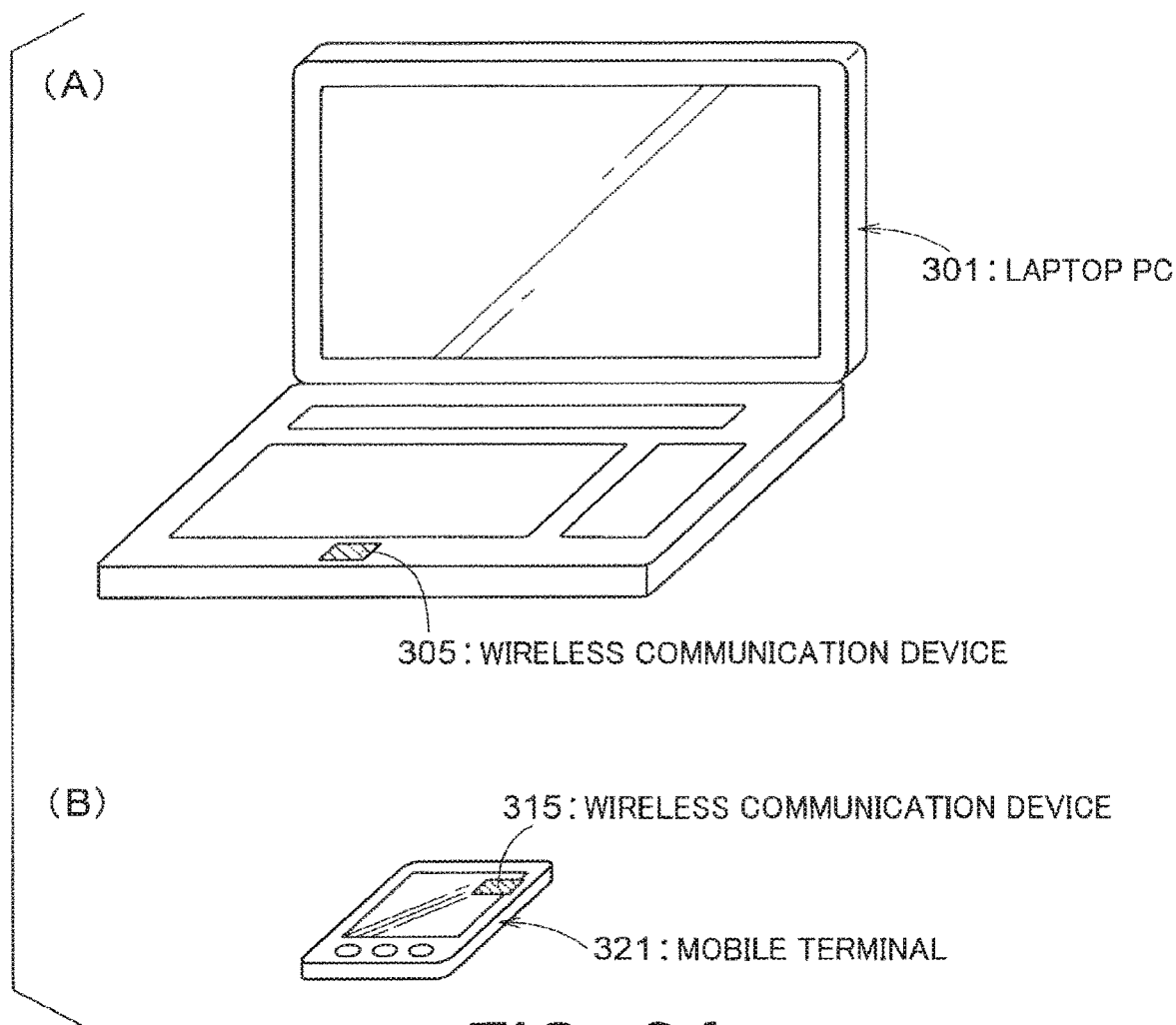
FIG. 24 is a perspective view of a wireless communication terminal in accordance with the embodiment of the present invention.

FIG. 24(A) and FIG. 24(B) are perspective views of wireless terminal according to the fourth embodiment. The wireless terminal in FIG. 24(A) is a notebook PC 301 and the wireless communication device (or a wireless device) in FIG. 24(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 25:
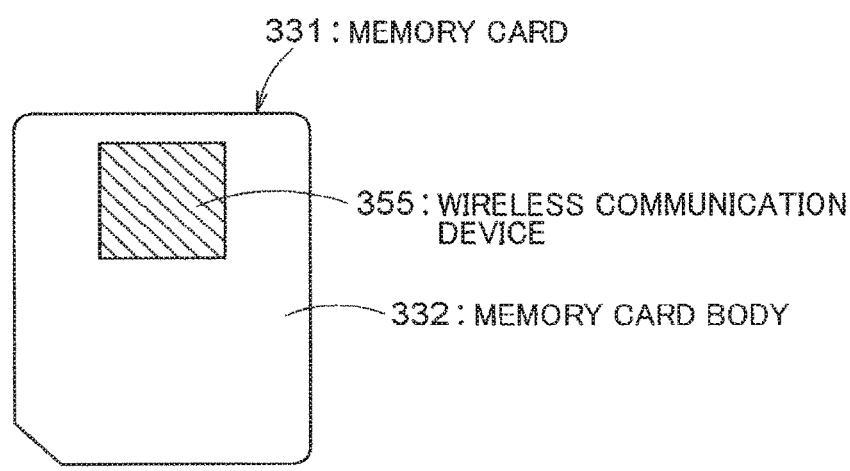
FIG. 25 is a diagram illustrating a memory card in accordance with the embodiment of the present invention.

Moreover, a wireless communication device installed in a terminal (which may indicate a base station) can also be provided in a memory card. FIG. 25 illustrates an example of a wireless communication device mounted on a memory card. A memory card 331 contains a wireless communication device 355 and a body case 332. The memory card 331 uses the wireless communication device 355 for wireless communication with external devices. Here, in FIG. 25, the description of other installed elements (for example, a memory, and so on) in the memory card 331 is omitted.

Fifth Embodiment

In the fifth embodiment, a bus, a processor unit and an external interface unit are provided in addition to the configuration of the wireless communication device according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Sixth Embodiment

In the sixth embodiment, a clock generating unit is provided in addition to the configuration of the wireless communication device according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Seventh Embodiment

In the seventh embodiment, a power source unit, a power source controlling unit and a wireless power feeding unit are included in addition to the configuration of the wireless communication device according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eighth Embodiment

In the eighth embodiment, a SIM card is added to the configuration of the wireless communication device according to the above embodiments. For example, the SIM card is connected with the MAC processing unit 10, the MAC/PHY management unit 60 or the controlling unit 112 in the wireless communication device. Thus, by adopting a configuration in which the SIM card is included in the wireless communication device, authentication processing can be easily performed.

Ninth Embodiment

In the ninth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Tenth Embodiment

In the tenth embodiment, an LED unit is added to the configuration of the wireless communication device according to any of the above embodiments. For example, the LED unit is connected to at least one of the MAC processing unit 10, the MAC/PHY management unit 60, the transmission processing circuit 113, the reception processing circuit 114 and the controlling circuit 112. Thus, by adopting a configuration in which the LED unit is included in the wireless communication device, notifying the operation state of the wireless communication device to the user can be easily done.

Eleventh Embodiment

In the eleventh embodiment, a vibrator unit is included in addition to the configuration of the wireless communication device according to any of the above embodiments. For example, the vibrator unit is connected to at least one of the MAC processing unit 10, the MAC/PHY management unit 60, the transmission processing circuit 113, the reception processing circuit 114 and the controlling circuit 112. Thus, by adopting a configuration in which the vibrator unit is included in the wireless communication device, notifying the operation state of the wireless communication device to the user can be easily done.

Twelfth Embodiment

In a twelfth embodiment, the configuration of the wireless communication device includes a display in addition to the configuration of the wireless communication device (the wireless communication device of the terminal (which may indicate the base station) according to any one of the above embodiments. The display may be connected to the MAC processing unit of the wireless communication device via a bus (not shown). As seen from the above, the configuration including the display to display the operation state of the wireless communication device on the display allows the operation status of the wireless communication device to be easily notified to a user.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In the IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 26:
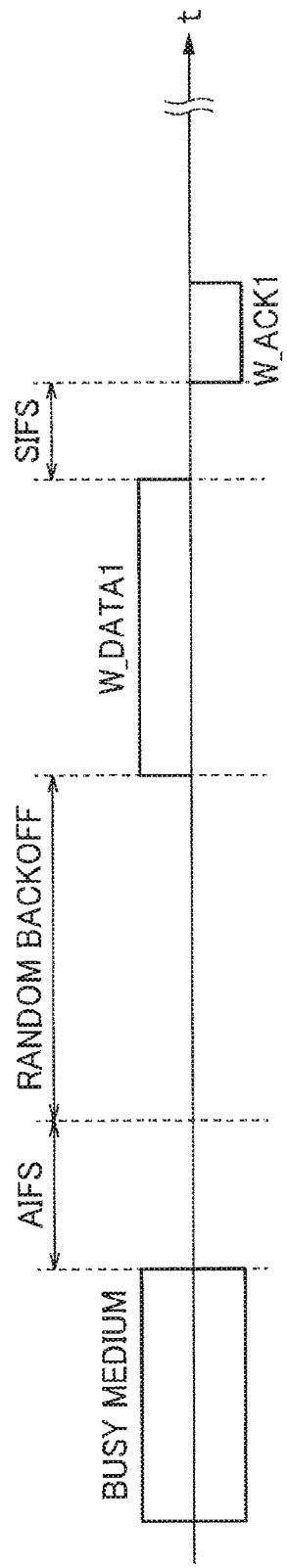
FIG. 26 is a diagram illustrating an example of exchange of frames during a contention period.

Here, FIG. 26 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit.

Note that the frames described in the embodiments may indicate not only things called frames in, for example, the IEEE 802.11 standard, but also things called packets, such as Null Data Packets. When it is expressed that the base station transmits or receives a plurality of frames or a plurality of X-th frames, the frames or the X-th frames may be the same (for example, the same type or the same content) or may be different. An arbitrary value can be put into X according to the situation. The plurality of frames or the plurality of X-th frames may be transmitted or received at the same time or may be transmitted or received at temporally different timings. When it is expressed that a first frame, a second frame, and the like are transmitted or received at temporally different points, the expression of the first, the second, and the like is just an expression for distinguishing the frames, and the types and the content of the frames may be the same or different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication system comprising:
   a wireless communication device, first wireless communication terminals, and second wireless communication terminals;
   wherein the wireless communication device comprises a transmitter configured to transmit a first frame including at least one pair of a first field and a second field corresponding to the first field,
      wherein one of a first group identifier or a second group identifier is selectively set in the first field of the at least one pair, the first group identifier indicating the first wireless communication terminals which have been associated with the wireless communication device, the second group identifier indicating the second wireless communication terminals which have not been associated with the wireless communication device, and
      wherein first information to designate a resource unit for random access is set in the second field corresponding to the first field in which the first group identifier or the second group identifier is set, and wherein the first frame triggers that:
each first wireless communication terminal of the first wireless communication terminals
if the each first wireless communication terminal has data for uplink transmission, determines a first counted value by counting a number of first fields in which the first group identifier is set, determines a first subtracted value by subtracting the determined first counted value from a randomly selected first counter, and determines whether the each first wireless communication terminal has a right to select a resource unit based on the first subtracted value,
in response to determining that the each first wireless communication terminal has the right to select a resource unit, randomly selects a first resource unit from the resource unit specified in the second field corresponding to the first field of the at least one pair in which the first group identifier is set, and
transmits a second frame via the randomly selected first resource unit in a fixed time after the first frame is received, and
each second wireless communication terminal of the second wireless communication terminals
if the each second wireless communication terminal has data for uplink transmission, determines a second counted value by counting a number of first fields in which the second group identifier is set, determines a second subtracted value by subtracting the determined second counted value from a randomly selected second counter, and determines whether the each second wireless communication terminal has a right to select a resource unit based on the second subtracted value,
in response to determining that the each second wireless communication terminal has the right to select a resource unit, randomly selects a second resource unit from the resource unit specified in the second field corresponding to the first field of the at least one pair in which the second group identifier is set, and
transmits a third frame via the randomly selected second resource unit in a fixed time after the first frame is received; and
wherein the wireless communication device comprises a receiver configured to receive at least one second frame or at least one third frame, transmitted in response to the first frame.

2. The wireless communication device system according to claim 1, wherein
the each first wireless communication terminal determines whether the each first wireless communication terminal has the right to select a resource unit based on comparison between the first subtracted value and a predetermined value, and
the each second wireless communication terminals determines whether the each second wireless communication terminal has the right to select a resource unit based on comparison between the second subtracted value and a predetermined value.

3. The wireless communication system according to claim 1, wherein
a terminal identifier of one of the first wireless communication terminals is selectively set in the first field of the at least one pair,
second information to designate a resource unit for the first wireless communication terminal having the terminal identifier is set in the second field corresponding to the first field in which the terminal identifier is set, and
the first frame allows the first wireless communication terminal having the terminal identifier specified in the first field to transmit the second frame via the resource unit designated in the second field corresponding to the first field in which the terminal identifier is set.

4. The wireless communication system according to claim 3, wherein
the first group identifier and the second group identifier are selected from AIDs (Association IDs) other than AIDs allowed to assign to wireless communication terminals among AIDs defined in IEEE 802.11 standard, and
the AIDs of the first group identifier and the second group identifier are different from each other, and
the terminal identifier is selected from the AIDs allowed to assign to wireless communication terminals among AIDs defined in IEEE 802.11 standard.

5. The wireless communication system according to claim 4, wherein the AIDs of the first group identifier and the second group identifier are selected from among 0 and values larger than 2007.

6. The wireless communication system according to claim 1, wherein
the each first wireless communication terminal determines whether the each first wireless communication terminal has a right to select a resource unit if the each first wireless communication terminal have data for uplink transmission and if at least one first field in which the first group identifier is set is included in the first frame, and
the each second wireless communication terminal determines whether the each second wireless communication terminal has a right to select a resource unit if the each second wireless communication terminal has data for uplink transmission and if at least one first field in which the second group identifier is set is included in the first frame.

7. The wireless communication system according to claim 1, wherein
the wireless communication device communicates according to IEEE 802.11 standard,
the each first wireless communication terminal is a wireless communication terminal having been assigned an AID (Association ID) by the wireless communication device, and
the each second wireless communication terminals is a wireless communication terminal having not been assigned an AID by the wireless communication device.

8. The wireless communication system according to claim 1, wherein the wireless communication device comprises at least one antenna.

9. The wireless communication system according to claim 1, wherein the wireless communication device is configured to be a base station.

10. A wireless communication method, comprising:
transmitting, by a wireless communication device, a first frame including at least one pair of a first field and a second field corresponding to the first field,
wherein one of a first group identifier or a second group identifier is selectively set in the first field of the at least one pair, the first group identifier indicating first wireless communication terminals which have been associated with the wireless communication device, the second group identifier indicating second wireless communication terminals which have not been associated with the wireless communication device, and wherein first information to designate a resource unit for random access is set in the second field corresponding to the first field in which the first group identifier or the second group identifier is set, wherein the first frame triggers that each first wireless communication terminal of the first wireless communication terminals if the each first wireless communication terminal has data for uplink transmission, determines a first counted value by counting a number of first fields in which the first group identifier is set, determines a first subtracted value by subtracting the determined first counted value from a randomly selected first counter, and determines whether the each first wireless communication terminal has a right to select a resource unit based on the first subtracted value, in response to determining that the each first wireless communication terminal has the right to select a resource unit, randomly selects a first resource unit from the resource unit specified in the second field corresponding to the first field of the at least one pair in which the first group identifier is set, and transmits a second frame via the randomly selected the resource unit in a fixed time after the first frame is received, and each second wireless communication terminal of the second wireless communication terminals if the each second wireless communication terminal has data for uplink transmission, determines a second counted value by counting a number of first fields in which the second group identifier is set, determines a second subtracted value by subtracting the determined second counted value from a randomly selected second counter, and determines whether the each second wireless communication terminal has a right to select a resource unit based on the second subtracted value, in response to determining that the each second wireless communication terminal has the right to select a resource unit, randomly selects a second resource unit from the resource unit specified in the second field corresponding to the first field of the at least one pair in which the second group identifier is set, and transmits a third frame via the randomly selected second resource unit in a fixed time after the first frame is received; and receiving, by the wireless communication device, at least one second frame or at least one third frame, transmitted in response to the first frame.

11. A wireless communication device comprising:

a receiver configured to receive a first frame including at least one pair of a first field and a second field corresponding to the first field, wherein one of a first group identifier or a second group identifier is selectively set in the first field of the at least one pair, the first group identifier indicating first wireless communication terminals which have been associated with a base station, the second group identifier indicating second wireless communication terminals which have not been associated with the base station, and wherein first information to designate a resource unit for random access is set in the second field corresponding to the first field in which the first group identifier or the second group identifier is set;

controlling circuitry configured to specify at least one first field in which the second group identifier is set from the at least one pair if the wireless communication device has not been associated with the base station and if the wireless communication device has data for uplink transmission, specify at least one first field in which the first group identifier is set from the at least one pair if the wireless communication device has been associated with the base station and if the wireless communication device has data for uplink transmission, if a wireless communication terminal has data for uplink transmission, determines a counted value by counting a number of first fields in which the first group identifier is set, determines a subtracted value by subtracting the determined counted value from a randomly selected counter, and determine whether the wireless communication terminal has a right to select a resource unit based on the subtracted value, and in response to determining that the wireless communication terminal has the right to select a resource unit, randomly select a resource unit from at least one resource unit specified in at least one second field corresponding to the at least one first field specified; and a transmitter configured to transmit a second frame via the randomly selected resource unit in a fixed time after the first frame is received.

12. The wireless communication device according to claim 11, wherein the controlling circuitry is configured to determine whether the wireless communication terminal has the right to select a resource unit based on comparison between the subtracted value and a predetermined value.

13. The wireless communication device according to claim 11, wherein a terminal identifier of one of the first wireless communication terminals is selectively set in the first field of the at least one pair, second information to designate a resource unit for the first wireless communication terminal having the terminal identifier of the one of the first wireless communication terminals is set in the second field corresponding to the first field in which the terminal identifier of the one of the first wireless communication terminals is set, the controlling circuitry is configured to check whether an identifier of the wireless communication device is identical to the terminal identifier included in the first field of the at least one pair in the first frame if the wireless communication device has data for uplink transmission, and the transmitter is configured to transmit the second frame via the resource unit designated in the second field corresponding to the first field in which the terminal identifier identical to the identifier of the wireless communication device is set.

14. The wireless communication device according to claim 11, wherein the wireless communication device communicates according to IEEE 802.11 standard, each of the first wireless communication terminals is a wireless communication terminal having been assigned an AID (Association ID) by the base station, and each of the second wireless communication terminal is a wireless communication terminal having not been assigned an AID by the base station.

15. The wireless communication device according to claim 14, wherein the first group identifier and the second group identifier are selected from AIDs other than AIDs allowed to assign to wireless communication terminals having been associated with the base station among AIDs defined in IEEE 802.11 standard, and the AIDs of the first group identifier and the second group identifier are different from each other.

16. The wireless communication device according to claim 15 wherein the AIDs of the first group identifier and the second group identifier are selected from among 0 and values larger than 2007.

17. The wireless communication device according to claim 11, further comprising at least one antenna.

* * * * *